United States Patent
Sawada et al.

(10) Patent No.: US 7,952,224 B2
(45) Date of Patent: May 31, 2011

(54) POWER SUPPLY SYSTEM, VEHICLE INCLUDING THE POWER SUPPLY SYSTEM, CONTROL METHOD FOR POWER SUPPLY SYSTEM, AND COMPUTER-READABLE RECORDING MEDIUM HAVING PROGRAM RECORDED THEREON FOR COMPUTER TO EXECUTE THE CONTROL METHOD

(75) Inventors: Hiroki Sawada, Toyota (JP); Masayuki Komatsu, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 264 days.

(21) Appl. No.: 12/310,564

(22) PCT Filed: Sep. 27, 2007

(86) PCT No.: PCT/JP2007/069421
§ 371 (c)(1),
(2), (4) Date: Feb. 27, 2009

(87) PCT Pub. No.: WO2008/041735
PCT Pub. Date: Apr. 10, 2008

(65) Prior Publication Data
US 2010/0096918 A1    Apr. 22, 2010

(30) Foreign Application Priority Data

Sep. 8, 2006  (JP) .................. 2005-263698
Aug. 31, 2007  (JP) .................. 2007-226428

(51) Int. Cl.
*B60L 1/00* (2006.01)
(52) U.S. Cl. ............... 307/9.1; 307/19; 307/24; 307/48; 307/72; 307/74; 307/75; 307/82; 903/907

(58) Field of Classification Search ............... 307/9.1, 307/19, 24, 48, 72, 74, 75, 82; 903/907
See application file for complete search history.

(56) References Cited

U.S. PATENT DOCUMENTS
2001/0019269 A1 *  9/2001  Yudahira ................ 324/426
2002/0190690 A1 * 12/2002  Tamai et al. ............ 320/103
(Continued)

FOREIGN PATENT DOCUMENTS
JP    A-6-209532    7/1994
(Continued)

OTHER PUBLICATIONS
JP 2003-059541 to Ito et al.—english translation, Feb. 28, 2003.*

*Primary Examiner* — Jared J Fureman
*Assistant Examiner* — Justen Fauth
(74) *Attorney, Agent, or Firm* — Oliff & Berridge, PLC

(57) ABSTRACT

A discharge share ratio calculation unit (52) calculates, for each power storage device, a remaining electric power quantity before an SOC is reached with respect to which an allowable discharge electric power is restricted, and calculates a discharge power share ratio between power storage devices according to the ratio of the remaining electric power quantity. A charge share ratio calculation unit (54) calculates, for each power storage device, a chargeable quantity before an SOC is reached with respect to which an allowable charge electric power is restricted, and calculates a charge power share ratio between power storage devices according to the ratio of the chargeable quantity. When electric power is supplied from a power supply system to a drive force generation unit, each converter is controlled according to the discharge power share ratio and, when electric power is supplied from the drive force generation unit to the power supply system, each converter is controlled according to the discharge power share ratio.

16 Claims, 17 Drawing Sheets

U.S. PATENT DOCUMENTS

2003/0107352 A1 6/2003 Downer et al.
2004/0061503 A1* 4/2004 Morimoto .................... 324/418

FOREIGN PATENT DOCUMENTS

| JP | A-10-174305 | 6/1998 |
| JP | A-11-187577 | 7/1999 |
| JP | A-2002-10502 | 1/2002 |
| JP | A-2003-209969 | 7/2003 |
| JP | A-2004-147477 | 5/2004 |

* cited by examiner

FIG.2
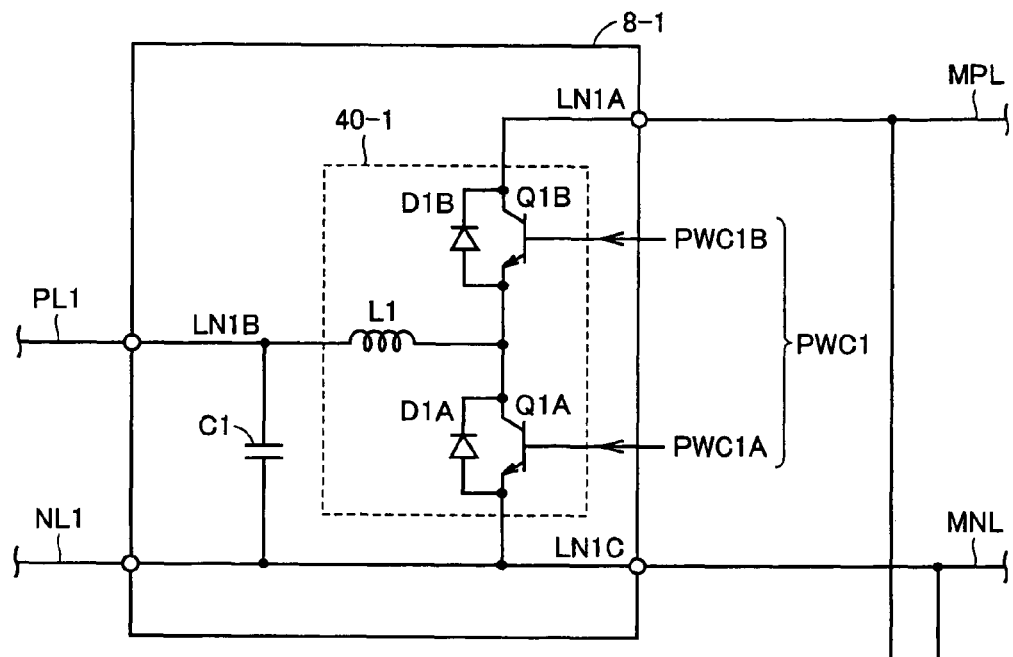
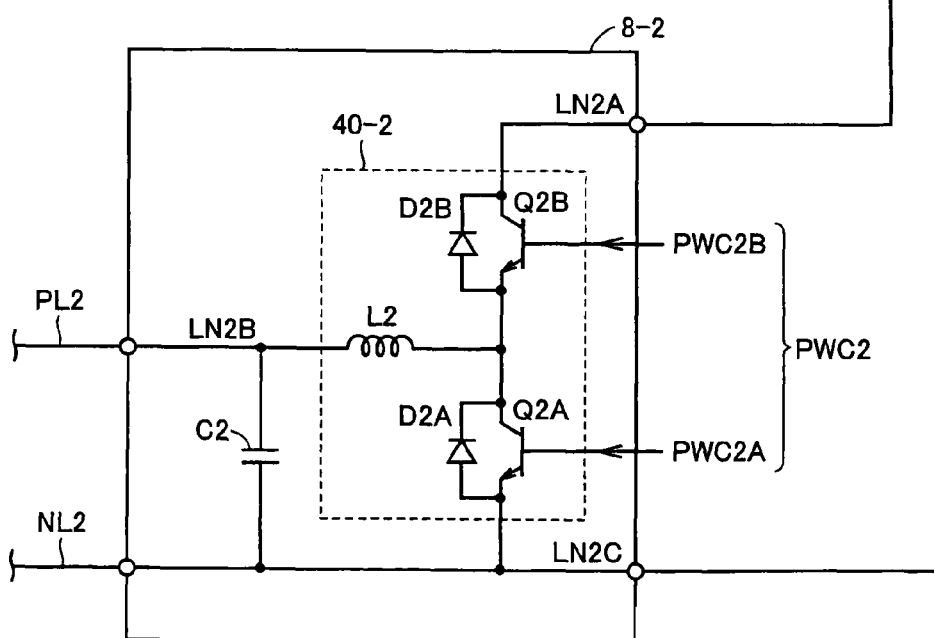

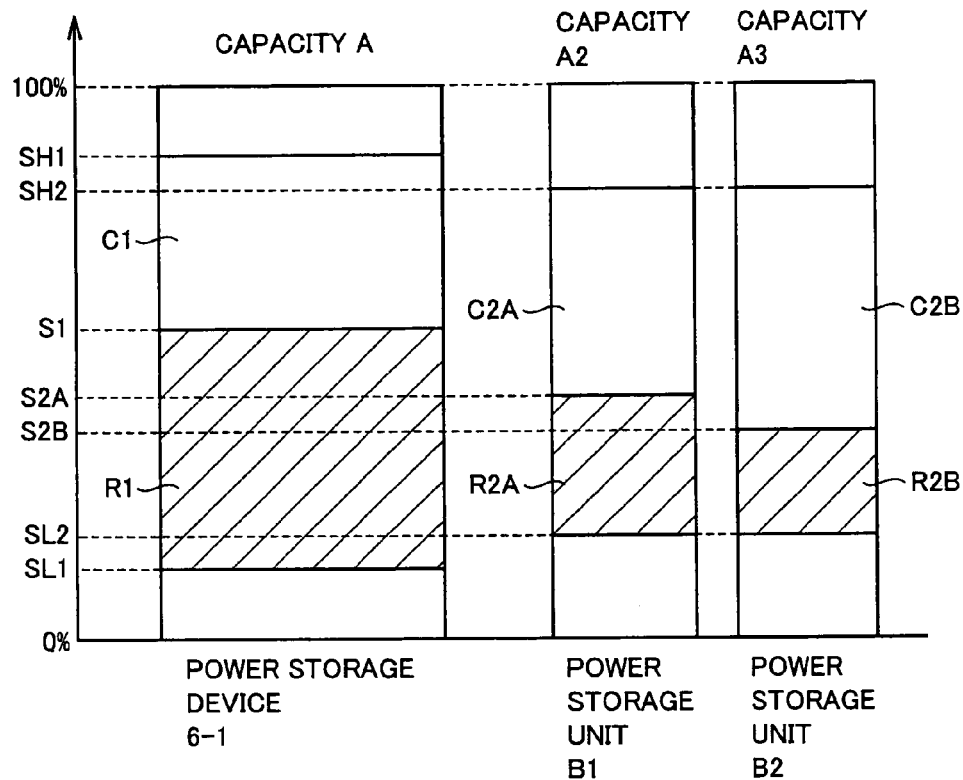
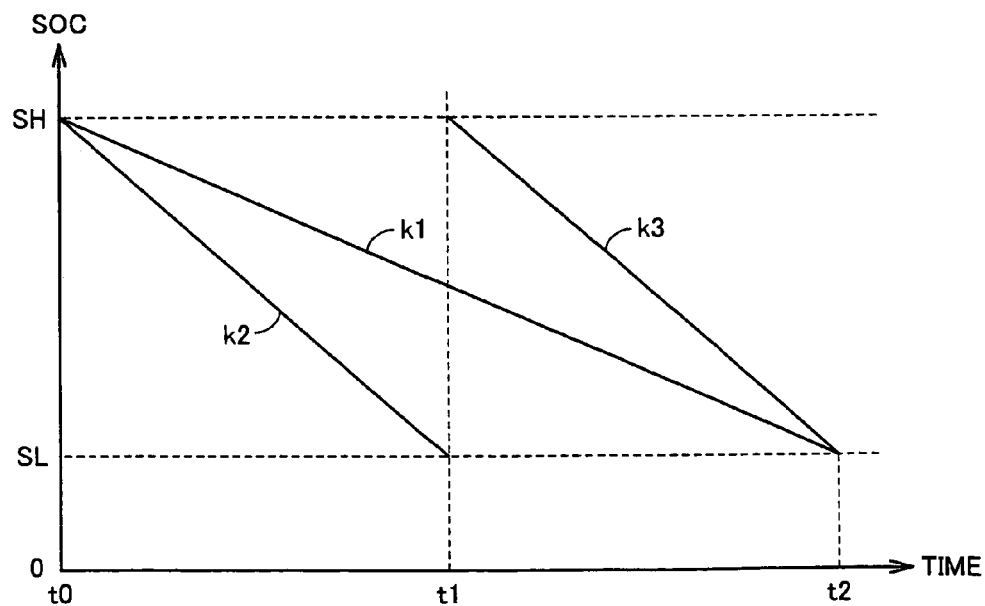

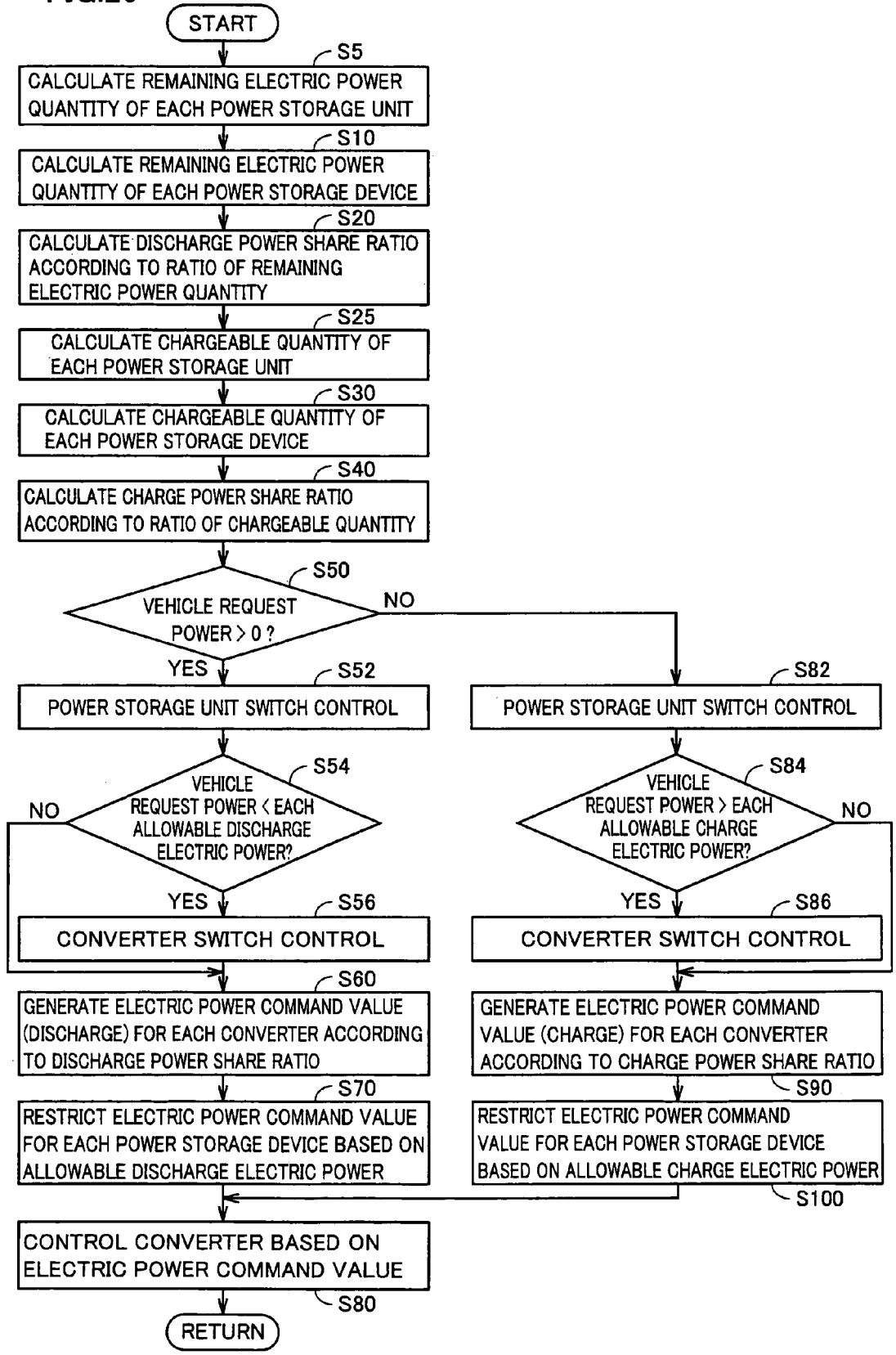

POWER SUPPLY SYSTEM, VEHICLE INCLUDING THE POWER SUPPLY SYSTEM, CONTROL METHOD FOR POWER SUPPLY SYSTEM, AND COMPUTER-READABLE RECORDING MEDIUM HAVING PROGRAM RECORDED THEREON FOR COMPUTER TO EXECUTE THE CONTROL METHOD

TECHNICAL FIELD

The present invention relates to charge and discharge control for a power supply system including a plurality of power storage devices.

BACKGROUND ART

Japanese Patent Laying-Open No. 2003-209969 discloses a power supply control system including a plurality of power supply stages. The power supply control system includes a plurality of power supply stages connected in parallel and supplying DC power to at least one inverter. Each power supply stage includes a battery and a boost/buck DC-DC converter.

In this power supply control system, a plurality of power supply stages are controlled in such a manner that allows a plurality of batteries included in said plurality of power supply stages respectively to be equally charged and discharged and thereby allows respective states of charge (SOC) of the batteries to be identical to each other.

In the case where the batteries have respective charge/discharge characteristics different from each other, however, if a plurality of batteries are charged/discharged equally like the power supply control system disclosed in the above-referenced Japanese Patent Laying-Open No. 2003-209969, any of the batteries reaches a discharge limit or charge limit before other batteries do. After this, the maximum discharge characteristic or charge characteristic of the power supply system as a whole cannot be derived.

DISCLOSURE OF THE INVENTION

An object of the present invention is therefore to provide a power supply system capable of deriving the system performance to the maximum extent even when a plurality of power storage devices have respective charge/discharge characteristics different from each other, and provide a vehicle including the power supply system.

Another object of the present invention is to provide a control method for a power supply system capable of sufficiently deriving the maximum system performance even when a plurality of power storage devices have respective charge/discharge characteristics different from each other, and provide a computer-readable recording medium having a program recorded thereon for a computer to execute the control method.

According to the present invention, a power supply system is capable of supplying and receiving electric power to and from a load device, and includes: a plurality of chargeable power storage devices; an electric power line for supplying and receiving electric power between the power supply system and the load device; a plurality of converters provided in association with the plurality of power storage devices; and a control device controlling the plurality of converters. Each converter performs voltage conversion between an associated power storage device and the electric power line. The control device includes a share ratio calculation unit and a converter control unit. The share ratio calculation unit performs at least one of a first calculation to determine a discharge power share ratio between respective electric powers to be discharged from the plurality of power storage devices, and a second calculation to determine a charge power share ratio between respective electric powers to be used for charging the plurality of power storage devices. The converter control unit performs at least one of a first control to control the plurality of converters according to the discharge power share ratio when electric power is supplied from the power supply system to the load device, and a second control to control the plurality of converters according to the charge power share ratio when electric power is supplied from the load device to the power supply system. The first calculation is performed to determine, for each of the plurality of power storage devices, a remaining electric power quantity before a state of charge (SOC) is reached with respect to which an allowable discharge electric power is restricted, and determine the discharge power share ratio according to a ratio of the remaining electric power quantity between the plurality of power storage devices. The second calculation is performed to determine, for each of the plurality of power storage devices, a chargeable quantity before a state of charge (SOC) is reached with respect to which an allowable charge electric power is restricted, and determine the charge power share ratio according to a ratio of the chargeable quantity between the plurality of power storage devices.

Preferably, the first calculation is performed to determine the remaining electric power quantity of each of the plurality of power storage devices, based on a value determined by subtracting, from a first state value representing a current state of charge, a second state value representing a state of charge at which restriction of the allowable discharge electric power is started, and based on a power storage capacity of an associated power storage device. The second calculation is performed to determine the chargeable quantity of each of the plurality of power storage devices, based on a value determined by subtracting the first state value from a third state value representing a state of charge at which restriction of the allowable charge electric power is started, and based on a power storage capacity of an associated power storage device.

Preferably, the control device further includes a correction unit. The correction unit corrects the discharge power share ratio and the charge power share ratio such that an imbalance between respective states of charge of the plurality of power storage devices is corrected.

More preferably, the plurality of power storage devices include a first power storage device and a second power storage device. The correction unit corrects the discharge power share ratio and the charge power share ratio according to a difference between a state value representing a state of charge of the first power storage device and a state value representing a state of charge of the second power storage device.

Preferably, at least one of the plurality of power storage devices includes a plurality of power storage units connected in parallel to each other to an associated converter. The first calculation for the power storage device including the plurality of power storage units is performed to determine a remaining electric power quantity of the power storage device by determining a sum of respective remaining electric power quantities of the plurality of power storage units. The second calculation for the power storage device including the plurality of power storage units is performed to determine a chargeable quantity of the power storage device by determining a sum of respective chargeable quantities of the plurality of power storage units.

More preferably, the power supply system further includes a plurality of system main relays provided in association with the plurality of power storage units. Each system main relay electrically connects and disconnects an associated power storage unit and the converter associated with the power storage device including the plurality of power storage units to and from each other. The converter control unit further controls operation of the plurality of system main relays such that the plurality of power storage units are used in a specified order and the order of use is switched at a specified timing.

Still more preferably, the plurality of power storage units are used simultaneously.

Preferably, the converter control unit alternately operates the plurality of converters and gate-blocks a non-operated converter, when a requested electric power of the load device is within a range of the allowable charge electric power and the allowable discharge electric power of each of the plurality of power storage devices.

According to the present invention, a vehicle includes: the power supply system as described above; and a drive force generation unit receiving electric power supplied from the power supply system to generate a drive force for the vehicle.

According to the present invention, a control method for a power supply system is a method for controlling a power supply system capable of supplying and receiving electric power to and from a load device. The power supply system includes: a plurality of chargeable power storage devices; an electric power line for supplying and receiving electric power between the power supply system and the load device; and a plurality of converters provided in association with the plurality of power storage devices. Each converter performs voltage conversion between an associated power storage device and the electric power line. The control method includes the steps of: performing at least one of a first calculation to determine a discharge power share ratio between respective electric powers to be discharged from the plurality of power storage devices, and a second calculation to determine a charge power share ratio between respective electric powers to be used for charging the plurality of power storage devices; and performing at least one of a first control to control the plurality of converters according to the discharge power share ratio when electric power is supplied from the power supply system to the load device, and a second control to control the plurality of converters according to the charge power share ratio when electric power is supplied from the load device to the power supply system. The first calculation is performed to determine, for each of the plurality of power storage devices, a remaining electric power quantity before a state of charge (SOC) is reached with respect to which an allowable discharge electric power is restricted, and determine the discharge power share ratio according to a ratio of the remaining electric power quantity between the plurality of power storage devices. The second calculation is performed to determine, for each of the plurality of power storage devices, a chargeable quantity before a state of charge (SOC) is reached with respect to which an allowable charge electric power is restricted, and determine the charge power share ratio according to a ratio of the chargeable quantity between the plurality of power storage devices.

Preferably, the first calculation is performed to determine the remaining electric power quantity of each of the plurality of power storage devices, based on a value determined by subtracting, from a first state value representing a current state of charge, a second state value representing a state of charge at which restriction of the allowable discharge electric power is started, and based on a power storage capacity of an associated power storage device. The second calculation is performed to determine the chargeable quantity of each of the plurality of power storage devices, based on a value determined by subtracting the first state value from a third state value representing a state of charge at which restriction of the allowable charge electric power is started, and based on a power storage capacity of an associated power storage device.

Preferably, the control method further includes the step of correcting the discharge power share ratio and the charge power share ratio such that an imbalance between respective states of charge of the plurality of power storage devices is corrected.

More preferably, the plurality of power storage devices include a first power storage device and a second power storage device. The step of correcting corrects the discharge power share ratio and the charge power share ratio according to a difference between a state value representing a state of charge of the first power storage device and a state value representing a state of charge of the second power storage device.

Preferably, at least one of the plurality of power storage devices includes a plurality of power storage units connected in parallel to each other to an associated converter. The first calculation for the power storage device including the plurality of power storage units is performed to determine a remaining electric power quantity of the power storage device by determining a sum of respective remaining electric power quantities of the plurality of power storage units. The second calculation for the power storage device including the plurality of power storage units is performed to determine a chargeable quantity of the power storage device by determining a sum of respective chargeable quantities of the plurality of power storage units.

More preferably, the power supply system further includes a plurality of system main relays provided in association with the plurality of power storage units. Each system main relay electrically connects and disconnects an associated power storage unit and the converter associated with the power storage device including the plurality of power storage units to and from each other. The control method further includes the step of controlling operation of the plurality of system main relays such that the plurality of power storage units are used in a specified order and the order of use is switched at a specified timing.

Still more preferably, the plurality of power storage units are used simultaneously.

Preferably, the control method further includes the steps of: determining whether or not a requested electric power of the load device is within a range of the allowable charge electric power and the allowable discharge electric power of each of the plurality of power storage devices; and alternately operating the plurality of converters and gate-blocking a non-operated converter, when it is determined that the requested electric power is within the range of the allowable charge electric power and the allowable discharge electric power.

According to the present invention, a recording medium is a computer-readable recording medium having a program recorded thereon for a computer to execute the control method as described above.

In accordance with the present invention, a calculation is performed, for each power storage device, of the remaining electric power quantity before a state of charge (SOC) is reached with respect to which the allowable discharge electric power is restricted. According to the ratio between respective remaining electric power quantities of the power storage devices, a calculation is performed of a share ratio between discharge electric powers to be discharged from a plurality of power storage devices respectively. When electric power is supplied from the power supply system to a load device, a plurality of converters are controlled according to the discharge power share ratio. Therefore, such a case where one of the power storage devices reaches the discharge limit before remaining power storage devices do is prevented. A calculation is also performed, for each power storage device, of the chargeable quantity before a state of charge (SOC) is reached with respect to which the allowable charge electric power is restricted. According to the ratio between respective chargeable quantities of the power storage devices, a calculation is performed of a share ratio between charge electric powers to be used for charging a plurality of power storage devices respectively. When electric power is supplied from the load device to the power supply system, a plurality of converters are controlled according to the charge power share ratio.

Therefore, such a case where one of the power storage devices reaches the charge limit before remaining power storage devices do is prevented.

In this way, the present invention maximizes the opportunity to allow the power supply system as a whole to achieve the maximum charge and discharge characteristics. Accordingly, even when a plurality of power storage devices have respective charge/discharge characteristics different from each other, the performance of the power supply system can be implemented to the maximum extent.

BRIEF DESCRIPTION OF THE DRAWINGS

FIG. 2 is a schematic configuration diagram of converters shown in FIG. 1.

FIG. 14 is a diagram illustrating a method for calculating the electric power share ratio between power storage devices.

FIG. 15 is a diagram showing an example of variations of SOCs of the power storage device and power storage units.

FIG. 20 is a flowchart illustrating a control structure of the converter ECU according to the fourth embodiment.

BEST MODES FOR CARRYING OUT THE INVENTION

Figure 1:
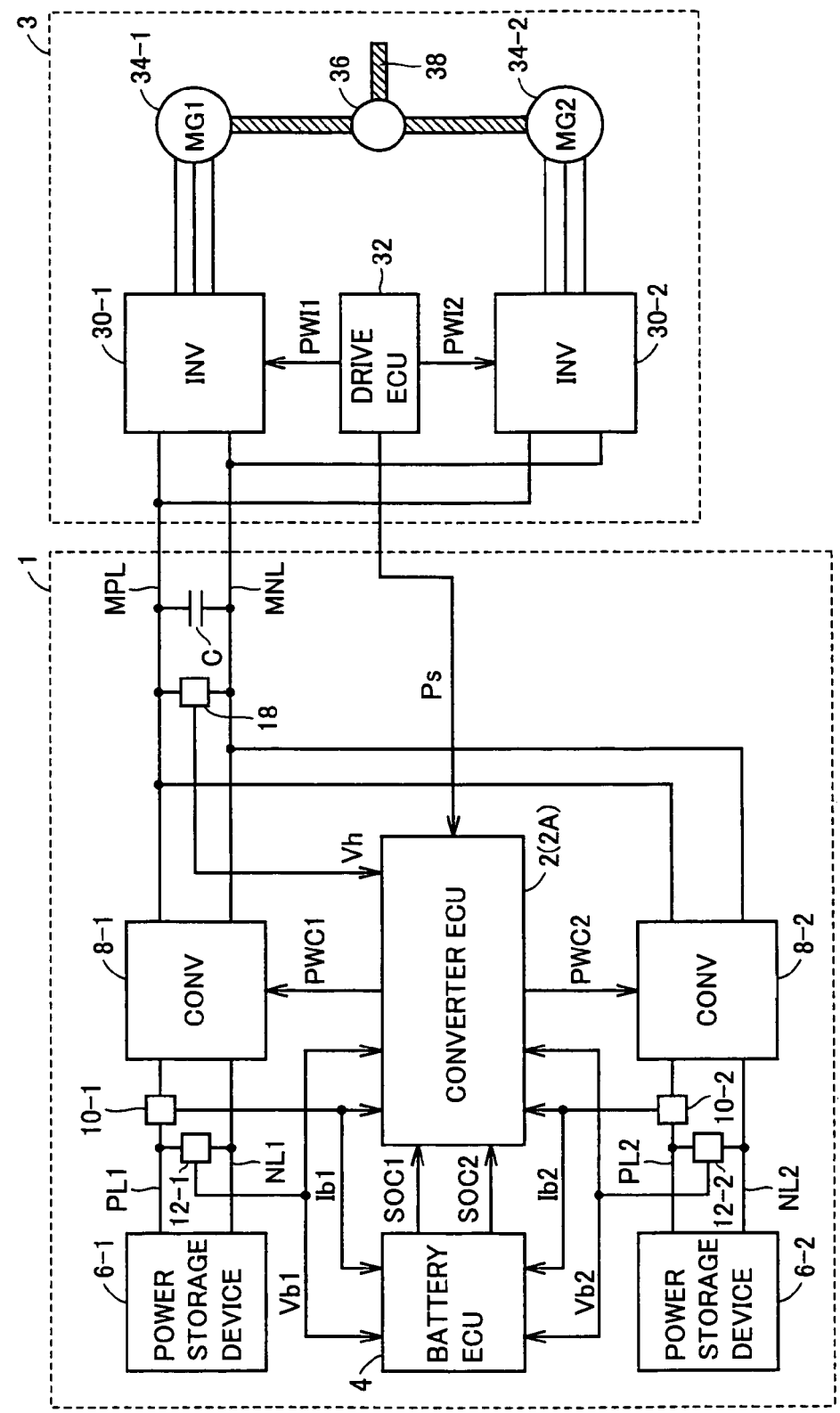
FIG. 1 is an overall block diagram of a vehicle according to a first embodiment of the present invention.

In the following, embodiments of the present invention will be described in detail with reference to the drawings. Here, like or corresponding components in the drawings are denoted by like reference characters, and a description thereof will not be repeated.

First Embodiment

FIG. 1 is an overall block diagram of a vehicle according to a first embodiment of the present invention. Referring to FIG. 1, this vehicle 100 includes a power supply system 1 and a drive force generation unit 3. Drive force generation unit 3 includes inverters 30-1, 30-2, motor generators 34-1, 34-2, a motive power transmission mechanism 36, a driveshaft 38, and a drive ECU (Electronic Control Unit) 32.

Inverters 30-1, 30-2 are connected in parallel to a main positive bus MPL and a main negative bus MNL. Inverters 30-1, 30-2 convert drive power (DC power) supplied from power supply system 1 into AC power, and output the AC power to motor generators 34-1, 34-2 respectively. Inverters 30-1, 30-2 also convert AC power generated by motor generators 34-1, 34-2 into DC power, and output the DC power as regenerative power to power supply system 1.

Here, inverters 30-1, 30-2 are each formed of a bridge circuit including switching elements for three phases for example. Inverters 30-1, 30-2 perform a switching operation according to respective drive signals PWI1, PWI2 from drive ECU 32 to drive respective associated motor generators.

Motor generators 34-1, 34-2 receive AC power supplied from inverters 30-1, 30-2 respectively to generate a rotational drive force. Motor generators 34-1, 34-2 also receive a rotational force from outside to generate AC power. For example, motor generators 34-1, 34-2 are each formed of a three-phase AC rotating electric machine including a rotor with a permanent magnet embedded therein. Motor generators 34-1, 34-2 are coupled to motive power transmission mechanism 36, and the rotational drive force is transmitted to wheels (not shown) via driveshaft 38 further coupled to motive power transmission mechanism 36.

In the case where drive force generation unit 3 is applied to the hybrid vehicle, motor generators 34-1, 34-2 are also coupled to an engine (not shown) via motive power transmission mechanism 36 or driveshaft 38. Drive ECU 32 performs control such that the ratio between the drive force generated by the engine and the drive force generated by motor generators 34-1, 34-2 is an optimum ratio. In an application to such a hybrid vehicle, one of motor generators 34-1, 34-2 may serve as an electric motor only while the other motor generator may serve as an electric generator only.

Drive ECU 32 calculates vehicle request power Ps based on a signal transmitted from each sensor (not shown), drive conditions and the accelerator pedal position for example, and calculates a target torque value and a target number of revolutions of motor generators 34-1, 34-2, based on the calculated vehicle request power Ps. Drive ECU 32 generates drive signals PWI1, PWI2 such that the torque generated by motor generators 34-1, 34-2 and the number of revolutions thereof reach respective target values, outputs the generated drive signals PWI1, PWI2 to respective associated inverters 30-1, 30-2, and controls inverters 30-1, 30-2 accordingly. Drive ECU 32 outputs the calculated vehicle request power Ps to a converter ECU 2 (described hereinlater) of power supply system 1.

Power supply system 1 includes power storage devices 6-1, 6-2, converters 8-1, 8-2, a smoothing capacitor C, converter ECU 2, a battery ECU 4, current sensors 10-1, 10-2, and voltage sensors 12-1, 12-2, 18.

Power storage devices 6-1, 6-2 are each a chargeable DC power supply and formed for example of a secondary battery such as nickel-metal hydride battery or lithium-ion battery. Power storage device 6-1 is connected to converter 8-1 via positive line PL1 and negative line NL1, while power storage device 6-2 is connected to converter 8-2 via positive line PL2 and negative line NL2.

As power storage device 6-1, a secondary battery whose maximum available output electric power is larger than power storage device 6-2 (the secondary battery is also called "output power density type") for example may be used. As power storage device 6-2, a secondary battery whose power storage capacity is larger than power storage device 6-1 (the secondary battery is also called "energy density type") for example may be used. In this way, the two power storage devices 6-1, 6-2 can be used to structure a high-power and large-capacity DC power supply. Here, at least one of power storage devices 6-1, 6-2 may be formed of an electrical double layer capacitor.

Converter 8-1 is provided between power storage device 6-1 and main positive and negative buses MPL, MNL, and performs voltage conversion between power storage device 6-1 and main positive and negative buses MPL, MNL, based on drive signal PWC1 from converter ECU 2. Converter 8-2 is provided between power storage device 6-2 and main positive and negative buses MPL, MNL, and performs voltage conversion between power storage device 6-2 and main positive and negative buses MPL, MNL, based on drive signal PWC2 from converter ECU 2.

Smoothing capacitor C is connected between main positive bus MPL and main negative bus MNL, and reduces an electric-power fluctuation component included in main positive bus MPL and main negative bus MNL. Voltage sensor 18 detects voltage value Vh across main positive bus MPL and main negative bus MNL, and outputs the result of detection to converter ECU 2.

Current sensors 10-1, 10-2 detect current value Ib1 that is input/output to/from power storage device 6-1 and current value Ib2 that is input/output to/from power storage device 6-2, respectively, and output respective results of detection to converter ECU 2 and battery ECU 4. Here, current sensors 10-1, 10-2 each detect the electric current (discharge current) output from the associated power storage device as a positive value, and detect the electric current (charge current) input to the associated power storage device as a negative value. The drawing here illustrates the case where current sensors 10-1, 10-2 detect respective current values of positive lines PL1, PL2, respectively. Alternatively, current sensors 10-1, 10-2 may detect respective currents of negative lines NL1, NL2, respectively. Voltage sensors 12-1, 12-2 detect voltage value Vb1 of power storage device 6-1 and voltage value Vb2 of power storage device 6-2, respectively, and output respective results of detection to converter ECU 2 and battery ECU 4.

Battery ECU 4 calculates state quantity SOC1 representing SOC of power storage device 6-1 based on current value Ib1 from current sensor 10-1 and voltage value Vb1 from voltage sensor 12-1, and outputs the calculated state quantity SOC1 to converter ECU 2. Battery ECU 4 also calculates state quantity SOC2 representing SOC of power storage device 6-2 based on current value Ib2 from current sensor 10-2 and voltage value Vb2 from voltage sensor 12-2, and outputs the calculated state quantity SOC2 to converter ECU 2. Here, various known methods may be used for calculating state quantities SOC1, SOC2.

Converter ECU 2 generates drive signals PWC1, PWC2 for driving converters 8-1, 8-2 respectively, based on respective detected values from current sensors 10-1, 10-2 and voltage sensors 12-1, 12-2, 18 as well as state quantities SOC1, SOC2 from battery ECU 4 and vehicle request power Ps from drive ECU 32. Converter ECU 2 outputs the generated drive signals PWC1, PWC2 to converters 8-1, 8-2 respectively, and accordingly controls converters 8-1, 8-2. The configuration of converter ECU 2 will be described in detail hereinlater.

FIG. 2 is a schematic configuration diagram of converters 8-1, 8-2 shown in FIG. 1. Since the configuration and the operation of converter 8-2 are similar to those of converter 8-1, the following description will be given about the configuration and operation of converter 8-1. Referring to FIG. 2, converter 8-1 includes a chopper circuit 40-1, a positive bus LN1A, a negative bus LN1C, a line LN1B and a smoothing capacitor C1. Chopper circuit 40-1 includes transistors Q1A, Q1B, diodes D1A, D1B and an inductor L1.

Positive bus LN1A has one end connected to the collector of transistor Q1B and the other end connected to main positive bus MPL. Negative bus LN1C has one end connected to negative line NL1 and the other end connected to main negative bus MNL.

Transistors Q1A, Q1B are connected in series between negative bus LN1C and positive bus LN1A. Specifically, the emitter of transistor Q1A is connected to negative bus LN1C and the collector of transistor Q1B is connected to positive bus LN1A. Diodes D1A, D1B are connected in inverse-parallel with transistors Q1A, Q1B respectively. Inductor L1 is connected to a point of connection of transistor Q1A and transistor Q1B.

Line LN1B has one end connected to positive line PL1 and the other end connected to inductor L1. Smoothing capacitor C1 is connected between line LN1B and negative bus LN1C, and reduces an AC component included in a DC voltage between line LN1B and negative bus LN1C.

In response to drive signal PWC 1 from converter ECU 2 (not shown), chopper circuit 40-1 steps up DC power (drive power) received from positive line PL1 and negative line NL1 when power storage device 6-1 is to be discharged, and steps down DC power (regenerative power) received from main positive bus MPL and main negative bus MNL when power storage device 6-1 is to be charged.

In the following, a voltage converting operation (voltage step-up operation and voltage step-down operation) of converter 8-1 will be described. In the voltage step-up operation, converter ECU 2 keeps transistor Q1B in the OFF state and turns on/off transistor Q1A at a predetermined duty ratio. In an ON period of transistor Q1A, discharge current flows from power storage device 6-1 to main positive bus MPL via line LN1B, inductor L1, diode D1B, and positive bus LN1A successively. At the same time, pump current flows from power storage device 6-1 via line LN1B, inductor L1, transistor Q1A and negative bus LN1C successively. The pump current causes inductor L1 to store electromagnetic energy. When transistor Q1A changes from the ON state to the OFF state, inductor L1 superposes the stored electromagnetic energy on the discharge current. As a result, the average voltage of the DC power supplied from converter 8-1 to main positive bus MPL and main negative bus MNL is increased by a voltage corresponding to the electromagnetic energy stored in inductor L1 according to the duty ratio.

In contrast, in the voltage step-down operation, converter ECU 2 turns on/off transistor Q1B at a predetermined duty ratio and keeps transistor Q1A in the OFF state. In an ON period of transistor Q1B, charge current flows from main positive bus MPL to power storage device 6-1 via positive bus LN1A, transistor Q1B, inductor L1 and line LN1B successively. When transistor Q1B changes from the ON state to the OFF state, inductor L1 generates a magnetic flux to interfere with a change in electric current, so that the charge current continuously flows via diode D1A, inductor L1 and line LN1B successively. In terms of the electrical energy, the DC power is supplied from main positive bus MPL and main negative bus MNL only in the ON period of transistor Q1B. Therefore, if the charge current is kept constant (the inductance of inductor L1 is sufficiently large), the average voltage of the DC power supplied from converter 8-1 to power storage device 6-1 is determined by multiplying the DC voltage between main positive bus MPL and main negative bus MNL by the duty ratio.

In order to control the voltage converting operation of converter 8-1 as described above, converter ECU 2 generates drive signal PWC1 including drive signal PWC1A for controlling ON/OFF of transistor Q1A and drive signal PWC1B for controlling the ON/OFF of transistor Q1B.

Figure 3:
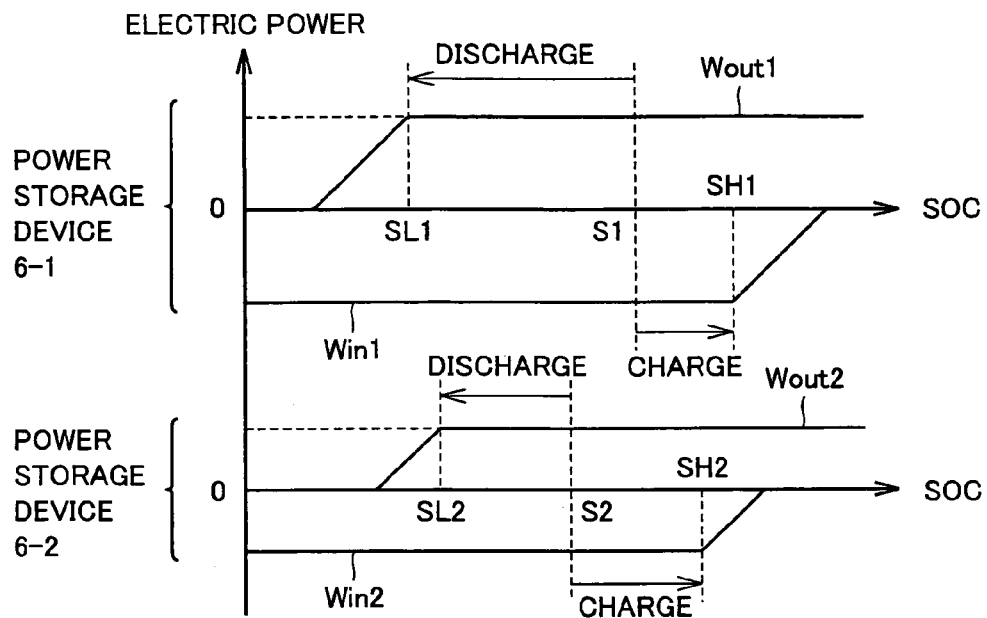
FIG. 3 is a diagram illustrating a concept about electric power share control for power storage devices.

FIG. 3 is a diagram illustrating a concept about electric power share control for power storage devices 6-1, 6-2. Referring to FIG. 3, allowable discharge electric power Wout1 is the maximum of the electric power that can be instantaneously output from power storage device 6-1. When SOC of power storage device 6-1 becomes smaller than lower limit SL1, allowable discharge electric power Wout1 is restricted. Allowable charge electric power Win1 is the maximum of the electric power that can be instantaneously input to power storage device 6-1. When SOC of power storage device 6-1 becomes larger than upper limit SH1, allowable charge electric power Win1 is restricted: Similarly, allowable discharge electric power Wout2 is the maximum of the electric power that can be instantaneously output from power storage device 6-2. When SOC of power storage device 6-2 becomes smaller than lower limit SL2, allowable discharge electric power Wout2 is restricted. Allowable charge electric power Win2 is the maximum of the electric power that can be instantaneously input to power storage device 6-2. When SOC of power storage device 6-2 becomes larger than upper limit SH2, allowable charge electric power Win2 is restricted.

The allowable discharge electric power and the allowable charge electric power of the power storage device vary depending on the characteristics of the power storage device. In general, the allowable discharge electric power and the allowable charge electric power of a secondary battery of the output density type are larger than those of a secondary battery of the energy density type. Further, the SOC with respect to which the allowable discharge electric power is restricted and the SOC with respect to which the allowable charge electric power is restricted also vary depending on the characteristics of the power storage device.

The case is now considered where respective SOCs of power storage devices 6-1, 6-2 are S1, S2, and electric power is supplied from power supply system 1 to drive force generation unit 3. If power storage devices 6-1, 6-2 are equally discharged ("equally discharged" here may include the case where respective quantities of discharged electric power from the power storage devices are equal to each other, and the case where respective decreases in SOC of the power storage devices are equal to each other), the allowable discharge electric power of any one of power storage devices 6-1, 6-2 is restricted before the allowable discharge electric power of the other power storage device is restricted. After this, regardless of the fact that the other power storage device still has a sufficient dischargeable capacity, the dischargeable capacity of power supply system 1 as a whole that is the sum of respective dischargeable capacities of power storage devices 6-1, 6-2 decreases.

Accordingly, in the first embodiment, the discharge power share ratio between power storage devices 6-1, 6-2 is calculated such that respective SOCs of power storage devices 6-1, 6-2 simultaneously reach respective lower limits SL1, SL2. When electric power is supplied from power supply system 1 to drive force generation unit 3, power storage devices 6-1, 6-2 are discharged according to the calculated discharge power share ratio. In this way, the opportunity (period of time) to effect the maximum dischargeable capacity of power supply system 1 as a whole can be maximized.

Another case is similarly considered where electric power is supplied from drive force generation unit 3 to power supply system 1. Specifically, if power storage devices 6-1, 6-2 are equally charged ("equally charged" here may include the case where the power storage devices are respectively charged with equal quantities of electric power, and the case where respective increases in SOC of the power storage devices are equal to each other), the allowable charge electric power of any one of power storage devices 6-1, 6-2 is restricted before the allowable charge electric power of the other power storage device is restricted. After this, regardless of the fact that the other power storage device still has a sufficient chargeable free capacity, the chargeable free capacity of power supply system 1 as a whole that is the sum of respective chargeable free capacities of power storage devices 6-1, 6-2 decreases.

Accordingly, in the first embodiment, the charge power share ratio between power storage devices 6-1, 6-2 is calculated such that respective SOCs of power storage devices 6-1, 6-2 simultaneously reach respective upper limits SH1, SH2. When electric power is supplied from drive force generation unit 3 to power supply system 1, power storage devices 6-1, 6-2 are charged according to the calculated charge power share ratio. In this way, the opportunity (period of time) to effect the maximum chargeable free capacity of power supply system 1 as a whole can be maximized.

Figure 4:
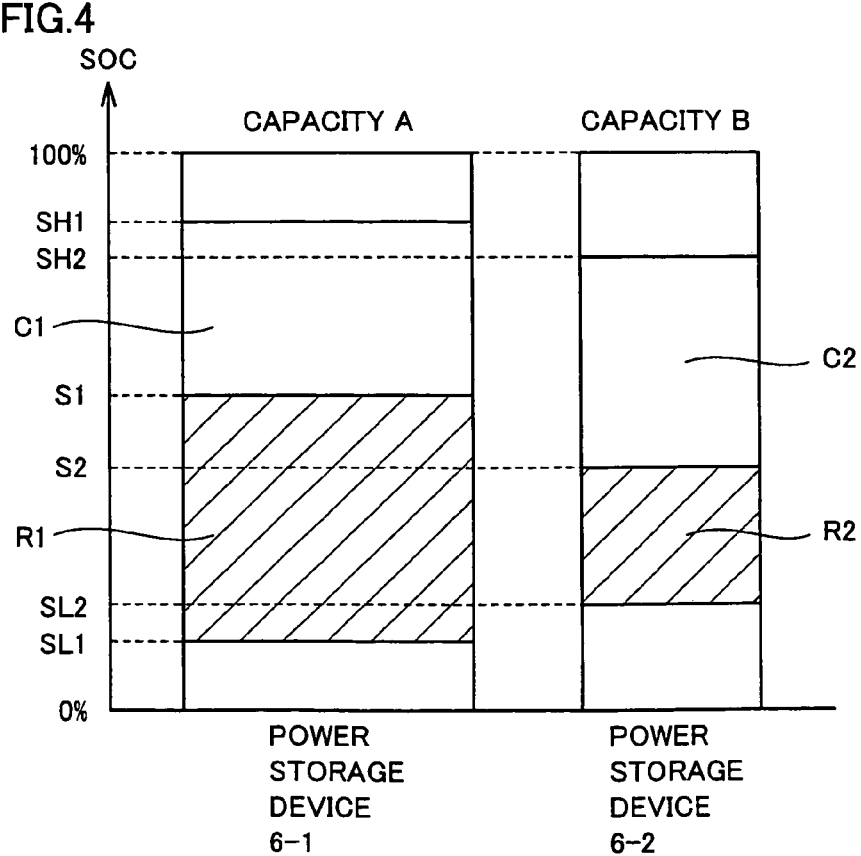
FIG. 4 is a diagram illustrating a method for calculating the electric power share ratio between power storage devices.

FIG. 4 is a diagram illustrating a method for calculating the electric power share ratio between power storage devices 6-1, 6-2. Referring to FIG. 4, a calculation is performed of remaining electric power quantity R1 of power storage device 6-1 before SOC of power storage device 6-1 reaches lower limit SL1 with respect to which allowable discharge electric power Wout1 of power storage device 6-1 is restricted, using the following formula:

$$R1 = A(S1-SL1) \qquad (1)$$

where A represents the power storage capacity of power storage device 6-1 and S1 represents SOC of power storage device 6-1 at the time when the calculation is performed.

A calculation is also performed of remaining electric power quantity R2 of power storage device 6-2 before SOC of power storage device 6-2 reaches lower limit SL2 with respect to which allowable discharge electric power Wout2 of power storage device 6-2 is restricted, using the following formula:

$$R2 = B(S2-SL2) \qquad (2)$$

where B represents the power storage capacity of power storage device 6-2 and S2 represents SOC of power storage device 6-2 at the time when the calculation is performed.

When electric power is supplied from power supply system 1 to drive force generation unit 3, power storage devices 6-1, 6-2 are discharged such that the share ratio between the discharge power from power storage device 6-1 and the discharge power from power storage device 6-2 is R1:R2.

A calculation is further performed of chargeable quantity C1 of power storage device 6-1 before SOC of power storage device 6-1 reaches upper limit SH1 with respect to which allowable charge electric power Win1 of power storage device 6-1 is restricted, using the following formula.

$$C1 = A(SH1 - S1) \tag{3}$$

A calculation is also performed of chargeable quantity C2 of power storage device 6-2 before SOC of power storage device 6-2 reaches upper limit SH2 with respect to which allowable charge electric power Win2 of power storage device 6-2 is restricted, using the following formula.

$$C2 = B(SH2 - S2) \tag{4}$$

When electric power is supplied from drive force generation unit 3 to power supply system 1, power storage devices 6-1, 6-2 are charged such that the share ratio between the electric power charging power storage device 6-1 and the electric power charging power storage device 6-2 is C1:C2.

Figure 5:
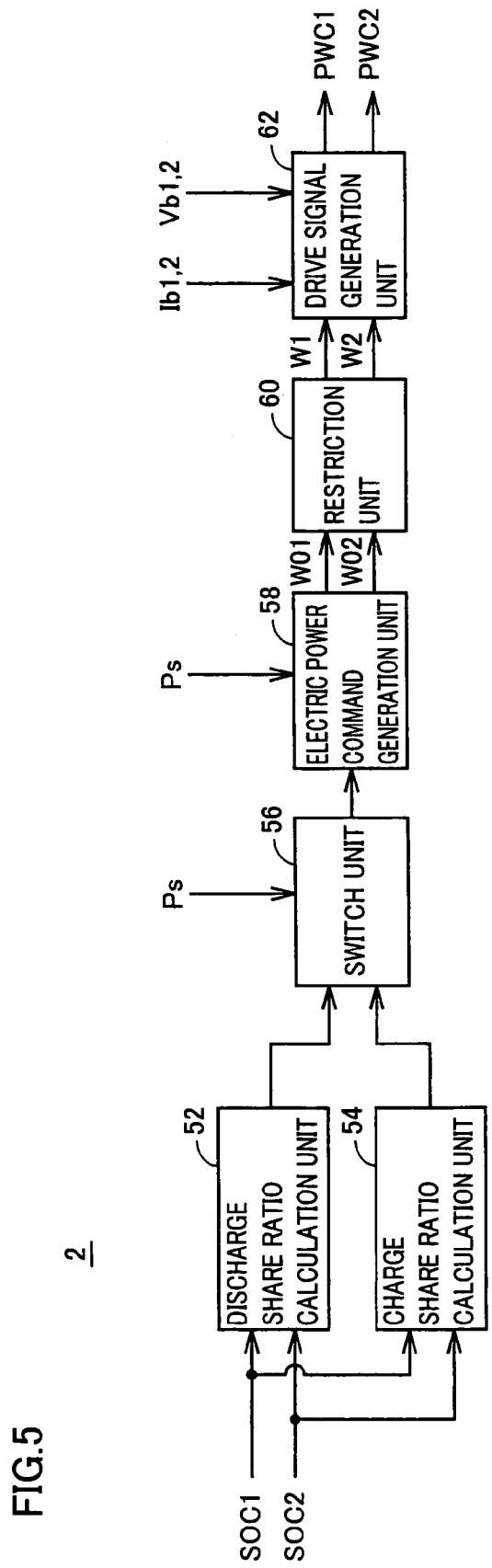
FIG. 5 is a functional block diagram of a converter ECU shown in FIG. 1.

FIG. 5 is a functional block diagram of converter ECU 2 shown in FIG. 1. Referring to FIG. 5, converter ECU 2 includes a discharge share ratio calculation unit 52, a charge share ratio calculation unit 54, a switch unit 56, an electric power command generation unit 58, a restriction unit 60, and a drive signal generation unit 62.

Discharge share ratio calculation unit 52 receives from battery ECU 4 state quantity SOC1 representing SOC of power storage device 6-1 and state quantity SOC2 representing SOC of power storage device 6-2. Discharge share ratio calculation unit 52 calculates remaining electric power quantities R1, R2 using formulas (1), (2) as described above, and outputs to switch unit 56 discharge power share ratio r1:r2 according to the ratio between calculated remaining electric power quantities R1, R2.

Charge share ratio calculation unit 54 receives state quantities SOC1, SOC2 from battery ECU 4. Charge share ratio calculation unit 54 calculates chargeable quantities C1, C2 using formulas (3), (4) as described above, and outputs to switch unit 56 charge power share ratio c1:c2 according to the ratio between calculated chargeable quantities C1, C2.

When vehicle request power Ps received from drive ECU 32 of drive force generation unit 3 is a positive value, namely electric power is to be supplied from power supply system 1 to drive force generation unit 3, switch unit 56 outputs, to electric power command generation unit 58, discharge power share ratio r1:r2 received from discharge share ratio calculation unit 52. In contrast, when vehicle request power Ps is a negative value, namely electric power is to be supplied from drive force generation unit 3 to power supply system 1, switch unit 56 outputs, to electric power command generation unit 58, charge power share ratio c1:c2 received from charge share ratio calculation unit 54.

When vehicle request power Ps received from drive ECU 32 is a positive value, electric power command generation unit 58 calculates respective electric power command values W01, W02 of power storage devices 6-1, 6-2 based on the discharge power share ratio received from switch unit 56, using the following formulas.

$$W01 = Ps \times r1/(r1 + r2) \tag{5}$$

$$W02 = Ps \times r2/(r1 + r2) \tag{6}$$

In contrast, when vehicle request power Ps is a negative value, electric power command generation unit 58 calculates respective electric power command values W01, W02 of power storage devices 6-1, 6-2 based on the charge power share ratio received from switch unit 56, using the following formulas.

$$W01 = Ps \times c1/(c1 + c2) \tag{7}$$

$$W02 = Ps \times c2/(c1 + c2) \tag{8}$$

Restriction unit 60 restricts electric power command value W01 for power storage device 6-1 that is generated by electric power command generation unit 58 within the range of allowable discharge electric power Wout1 and allowable charge electric power Win1, and outputs the command value as electric power command value W1. Restriction unit 60 also restricts electric power command value W02 for power storage device 6-2 generated by electric power command generation unit 58 within the range of allowable discharge electric power Wout2 and allowable charge electric power Win2, and outputs the command value as electric power command value W2.

In the case where one of electric power command values W01, W02 is restricted, restriction unit 60 applies the excess which is out of the restriction range to the other electric power command value if the other electric power command value has an allowance relative to the allowable discharge electric power or allowable charge electric power.

Drive signal generation unit 62 receives respective voltage values Vb1, Vb2 from voltage sensors 12-1, 12-2 and receives respective current values Ib1, Ib2 from current sensors 10-1, 10-2. Based on the detected values and electric power command values W1, W2 from restriction unit 60, drive signal generation unit 62 generates drive signals PWC1, PWC2 for driving converters 8-1, 8-1 respectively, by the method described hereinlater, and outputs the generated drive signals PWC1, PWC2 to converters 8-1, 8-2, respectively.

Figure 6:
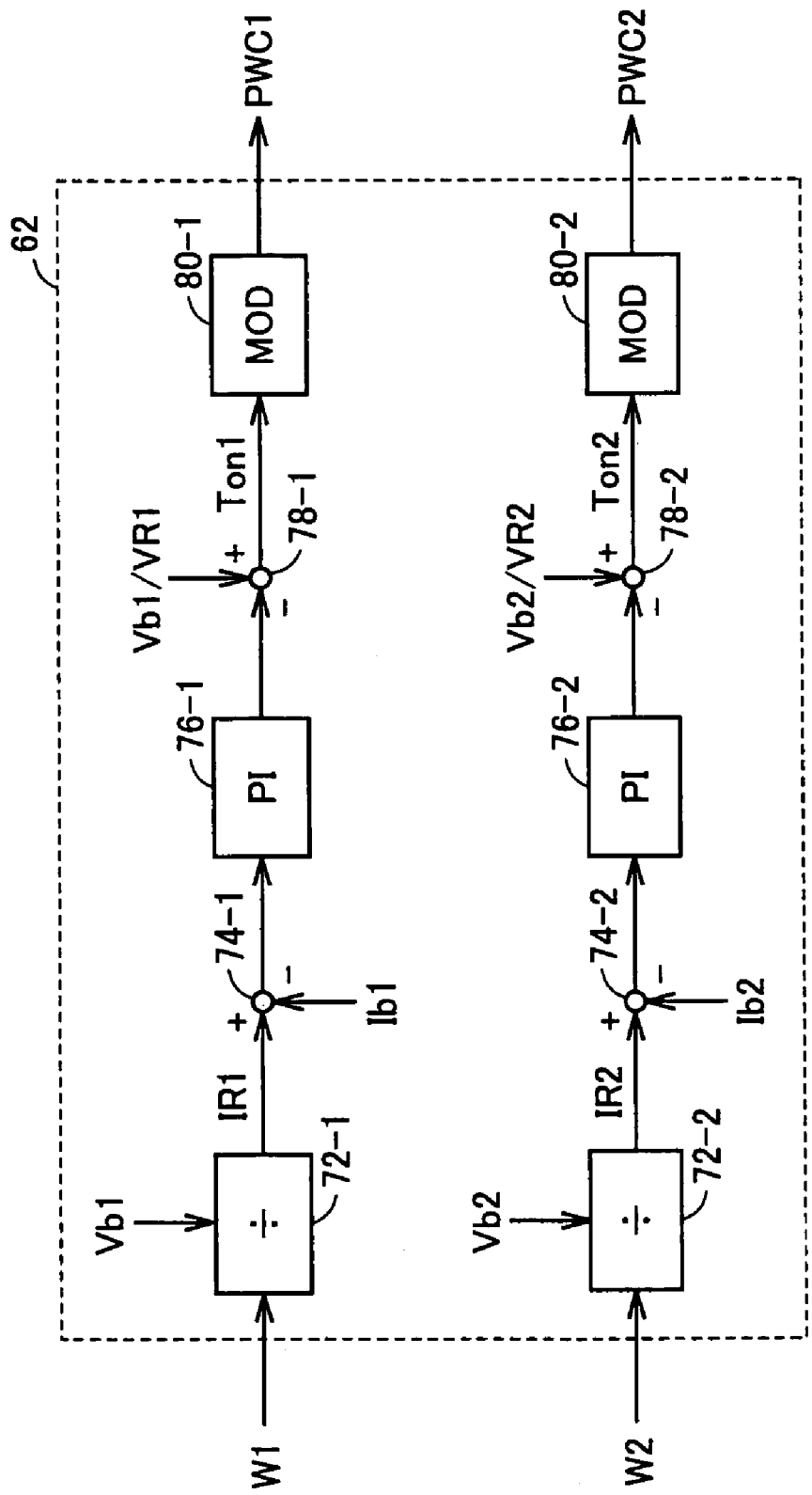
FIG. 6 is a detailed functional block diagram of a drive signal generation unit shown in FIG. 5.

FIG. 6 is a detailed functional block diagram of drive signal generation unit 62 shown in FIG. 5. Referring to FIG. 6, drive signal generation unit 62 includes division units 72-1, 72-2, subtraction units 74-1, 74-2, 78-1, 78-2, PI control units 76-1, 76-2, and modulation units 80-1, 80-2.

Division unit 72-1 divides electric power command value W1 by voltage value Vb1, and outputs the result of the calculation as target current value IR1 to subtraction unit 74-1. Subtraction unit 74-1 subtracts current value Ib1 from target current value IR1, and outputs the result of the calculation to PI control unit 76-1. PI control unit 76-1 receives the difference between target current value IR1 and current value Ib1 and performs proportional-integral operation on the difference, and outputs the result of the calculation to subtraction unit 78-1.

Subtraction unit 78-1 subtracts the output of PI control unit 76-1 from the inverse of the theoretical voltage step-up ratio of converter 8-1 indicated by (voltage value Vb1)/(target voltage VR1), and outputs the result of calculation as duty command Ton1 to modulation unit 80-1. The input term (voltage value Vb1)/(target voltage VR1) of subtraction unit 78-1 is a feedforward compensation term based on the theoretical voltage step-up ratio of converter 8-1, and target voltage VR1 is set to an appropriate value higher than voltage value Vb1.

Modulation unit 80-1 generates drive signal PWC1 based on duty command Ton1 and the carrier wave generated by an oscillation unit (not shown), and outputs the generated drive signal PWC1 to transistors Q1A, Q1B of converter 8-1.

Division unit 72-2 divides electric power command value W2 by voltage value Vb2, and outputs the result of the calculation as target current value IR2 to subtraction unit 74-2. Subtraction unit 74-2 subtracts current value Ib2 from target current value IR2, and outputs the result of the calculation to PI control unit 76-2. PI control unit 76-2 receives the difference between target current value IR2 and current value Ib2, and performs proportional-integral operation on the difference, and outputs the result of the calculation to subtraction unit 78-2.

Subtraction unit 78-2 subtracts the output of PI control unit 76-2 from the inverse of the theoretical voltage step-up ratio of converter 8-2 indicated by (voltage value Vb2)/(target voltage VR2), and outputs the result of the calculation as duty command Ton2 to modulation unit 80-2. The input term ((voltage value Vb2)/(target voltage VR2)) of subtraction unit 78-2 is a feedforward compensation term based on the theoretical voltage step-up ratio of converter 8-2, and target voltage VR2 is set to an appropriate value higher than voltage value Vb2.

Modulation unit 80-2 generates drive signal PWC2 based on duty command Ton2 and the carrier wave generated by an oscillation unit (not shown), and outputs the generated drive signal PWC2 to transistors Q2A, Q2B of converter 8-2.

Figure 7:
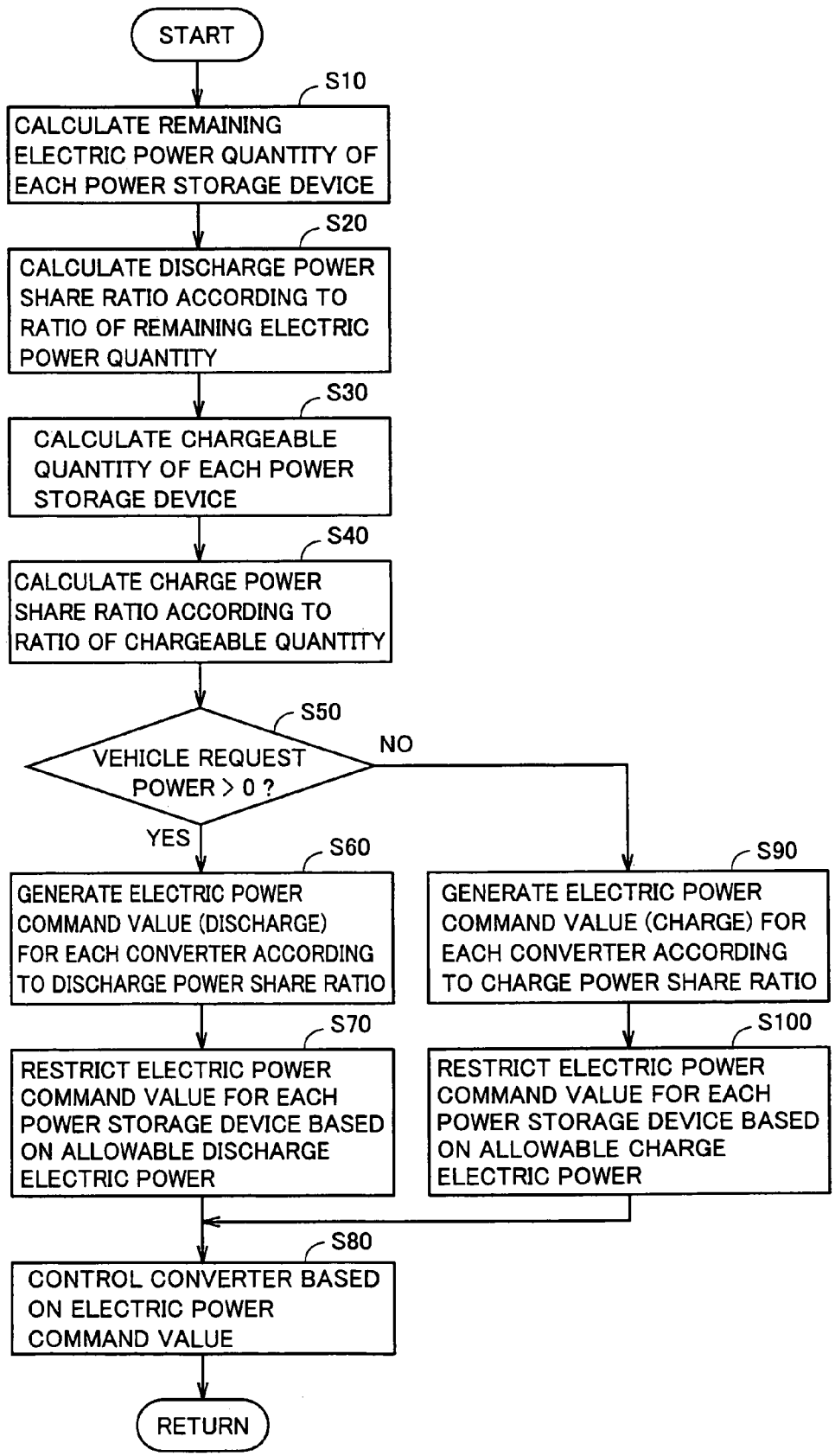
FIG. 7 is a flowchart illustrating a control structure of the converter ECU shown in FIG. 1.

FIG. 7 is a flowchart illustrating a control structure of converter ECU 2 shown in FIG. 1. The process of the flowchart is called from a main routine and executed at regular intervals or each time a predetermined condition is satisfied.

Referring to FIG. 7, converter ECU 2 calculates remaining electric power quantity R1 of power storage device 6-1 and remaining electric power quantity R2 of power storage device 6-2 using above formulas (1), (2), based on state quantities SOC1, SOC2 from battery ECU 4 (step S10). Converter ECU 2 calculates discharge power share ratio r1:r2 according to the ratio between remaining electric power quantities R1, R2 as calculated (step S20).

Converter ECU 2 also calculates chargeable quantity C1 of power storage device 6-1 and chargeable quantity C2 of power storage device 6-2 using above formulas (3), (4), based on state quantities SOC1, SOC2 (step S30). Converter ECU 2 calculates charge power share ratio c1:c2 according to the ratio between chargeable quantities C1, C2 as calculated (step S40).

Subsequently, converter ECU 2 determines whether or not vehicle request power Ps received from drive ECU 32 is a positive value (step S50). When converter ECU 2 determines that vehicle request power Ps is a positive value (YES in step S50), converter ECU 2 uses above formulas (5), (6) to generate electric power command values W01, W02 (discharge) for converters 8-1, 8-2 according to discharge power share ratio r1:r2 (step S60).

Subsequently, when electric power command value W01 is larger than allowable discharge electric power Wout1, converter ECU 2 restricts electric power command value W01 to allowable discharge electric power Wout1 to generate final electric power command value W1. When electric power command value W02 is larger than allowable discharge electric power Wout2, converter ECU 2 restricts electric power command value W02 to allowable discharge electric power Wout2 to generate final electric power command value W2 (step S70). Converter ECU 2 generates drive signals PWI1, PWI2 based on electric power command values W1, W2 to control converters 8-1, 8-2 (step S80).

In contrast, when it is determined that vehicle request power Ps is not a positive value in step S50 (NO in step S50), converter ECU 2 generates electric power command values W01, W02 (charge) for respective converters 8-1, 8-2 according to charge power share ratio c1:c2 using above formulas (7), (8) (step S90).

Subsequently, when the absolute value of electric power command value W01 is larger than the absolute value of allowable charge electric power Win1, converter ECU 2 restricts electric power command value W01 to allowable charge electric power Win1 to generate final electric power command value W1. When the absolute value of electric power command value W02 is larger than the absolute value of allowable charge electric power Win2, converter ECU 2 restricts electric power command value W02 to allowable charge electric power Win2 to generate final electric power command value W2 (step S100). Converter ECU 2 proceeds to step S80 to control converters 8-1, 8-2 based on electric power command values W1, W2.

In the first embodiment as described above, a calculation is performed of respective remaining electric power quantities of power storage devices 6-1, 6-2 before SOC with respect to which the allowable discharge electric power is restricted is reached, and the discharge power share ratio between power storage devices 6-1, 6-2 is calculated according to the ratio between the remaining electric power quantities. When electric power is supplied from power supply system 1 to drive force generation unit 3, converters 8-1, 8-2 are controlled according to the discharge power share ratio, so that the case where one of the power storage devices reaches the discharge limit before the other power storage device does is prevented. Further, a calculation is performed of respective chargeable quantities of power storage devices 6-1, 6-2 before SOC with respect to which the allowable charge electric power is restricted is reached. According to the ratio between the chargeable quantities, the charge power share ratio between power storage devices 6-1, 6-2 is calculated. When electric power is supplied from drive force generation unit 3 to power supply system 1, converters 8-1, 8-2 are controlled according to the charge power share ratio, so that the case where one of the power storage devices reaches the charge limit before the other power storage device does is prevented.

As seen from the above, the first embodiment maximizes the opportunity to achieve the maximum charge/discharge characteristics of power supply system 1 as a whole. Accordingly, even in the case where respective charge/discharge characteristics of power storage devices 6-1, 6-2 are different, the performance of power supply system 1 can be effected to the maximum extent.

Second Embodiment

In the case where the absolute value of vehicle request power Ps becomes larger and the discharge electric power from power storage devices 6-1, 6-2 is restricted to the allowable discharge electric power or the charge electric power is restricted to the allowable charge electric power, the power storage devices are discharged or charged without according to the above-described electric power share ratio. Under this condition, when power storage devices 6-1, 6-2 are discharged, SOC of one of the power storage devices whose power storage capacity is smaller becomes lower before SOC of the other power storage device does. Therefore, SOC of the power storage device whose power storage capacity is smaller may be made larger than SOC of the other power storage device. When power storage devices 6-1, 6-2 are to be charged, however, SOC of the power storage device whose power storage capacity is smaller becomes higher before SOC of the other power storage device does. Therefore, contrary to the discharge, SOC of the power storage device whose power storage capacity is smaller may be made smaller than SOC of the other power storage device.

In consideration of both of the charge and the discharge, it is preferable to make respective SOCs of power storage devices 6-1, 6-2 close to each other as much as possible.

Accordingly, the opportunity (period of time) to effect the maximum chargeable free capacity and dischargeable capacity of power supply system 1 as a whole 1 can be maximized, without impairing one of the dischargeable capacity or chargeable free capacity.

The entire configuration of the vehicle in the second embodiment is identical to that of vehicle 100 in the first embodiment shown in FIG. 1.

Figure 8:
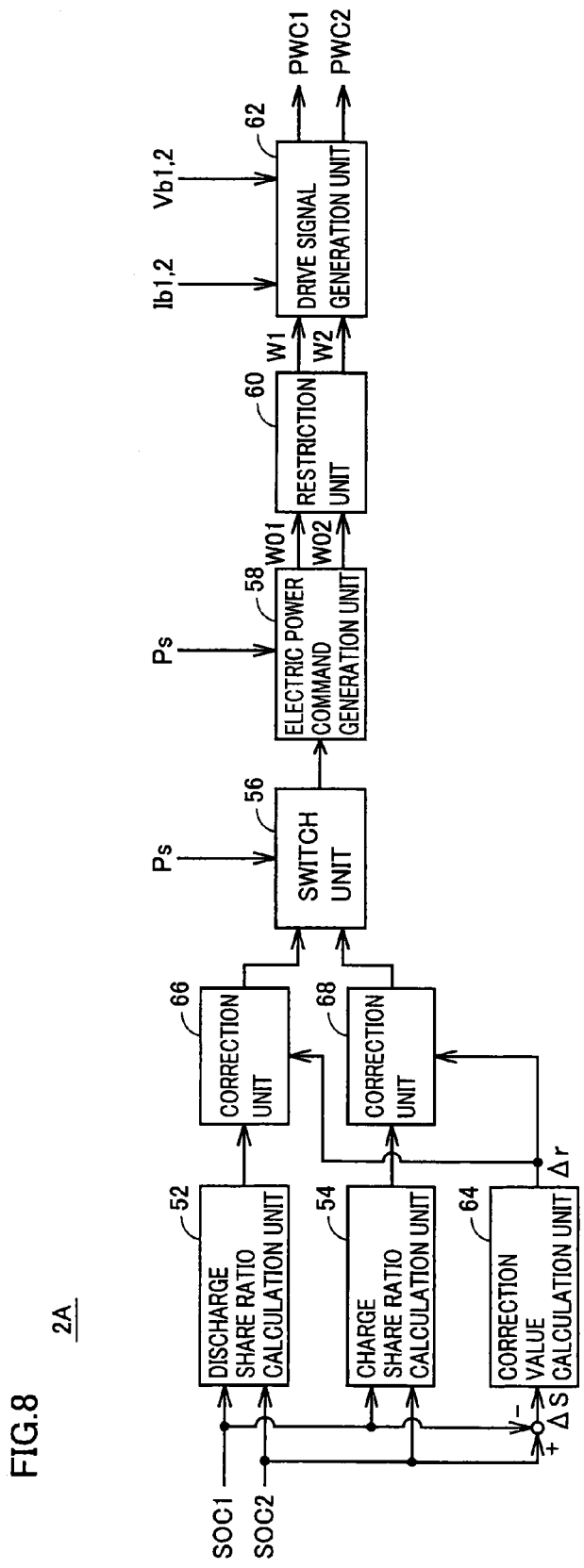
FIG. 8 is a functional block diagram of a converter ECU according to a second embodiment.

FIG. 8 is a functional block diagram of a converter ECU 2A in the second embodiment. Referring to FIG. 8, converter ECU 2A includes, in addition to the components of converter ECU 2 in the first embodiment shown in FIG. 5, a correction value calculation unit 64 and correction units 66, 68.

Figure 9:
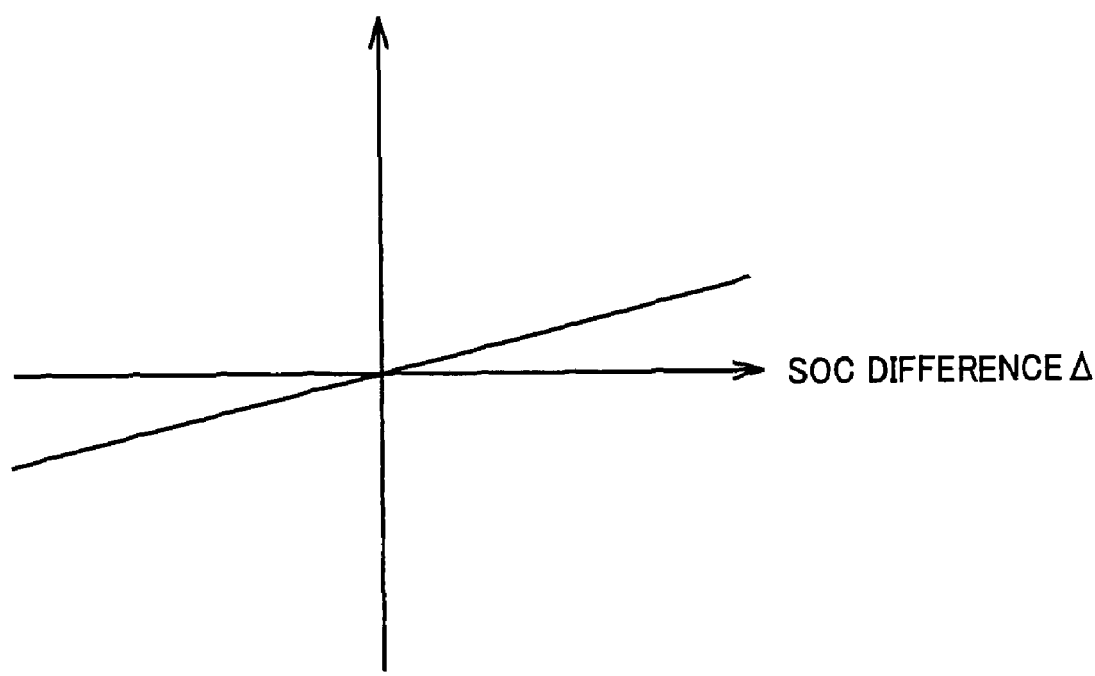
FIG. 9 is a diagram showing a relation between the SOC difference of power storage devices and a correction amount.

Correction value calculation unit 64 receives SOC difference ΔS determined by subtracting state quantity SOC1 indicating SOC of power storage device 6-1 from state quantity SOC2 indicating SOC of power storage device 6-2. Correction value calculation unit 64 uses a specified map as shown in FIG. 9 or formula to calculate correction amount Δr according to SOC difference ΔS. Specifically, when SOC difference ΔS is a positive value, positive correction amount Δr is calculated according to SOC difference ΔS. When SOC difference ΔS is a negative value, negative correction amount Δr is calculated according to SOC difference ΔS.

Correction unit 66 corrects discharge power share ratio r1:r2 from discharge share ratio calculation unit 52 based on correction amount Δr calculated by correction value calculation unit 64. Specifically, correction unit 66 corrects the discharge power share ratio by adding correction amount Δr to r2 representing the discharge share ratio of power storage device 6-2. Namely, when state quantity SOC2 is larger than state quantity SOC1, the discharge power share ratio from discharge share ratio calculation unit 52 is corrected such that the discharge share ratio of power storage device 6-2 increases.

Correction unit 68 corrects charge power share ratio c1:c2 from charge share ratio calculation unit 54 based on correction amount Δr calculated by correction value calculation unit 64. Specifically, correction unit 68 corrects the charge power share ratio by subtracting correction amount Δr from c2 representing the charge share ratio of power storage device 6-2. Namely, when state quantity SOC2 is larger than state quantity SOC1, the charge power share ratio from charge share ratio calculation unit 54 is corrected such that the charge share ratio of power storage device 6-2 increases.

Figure 10:
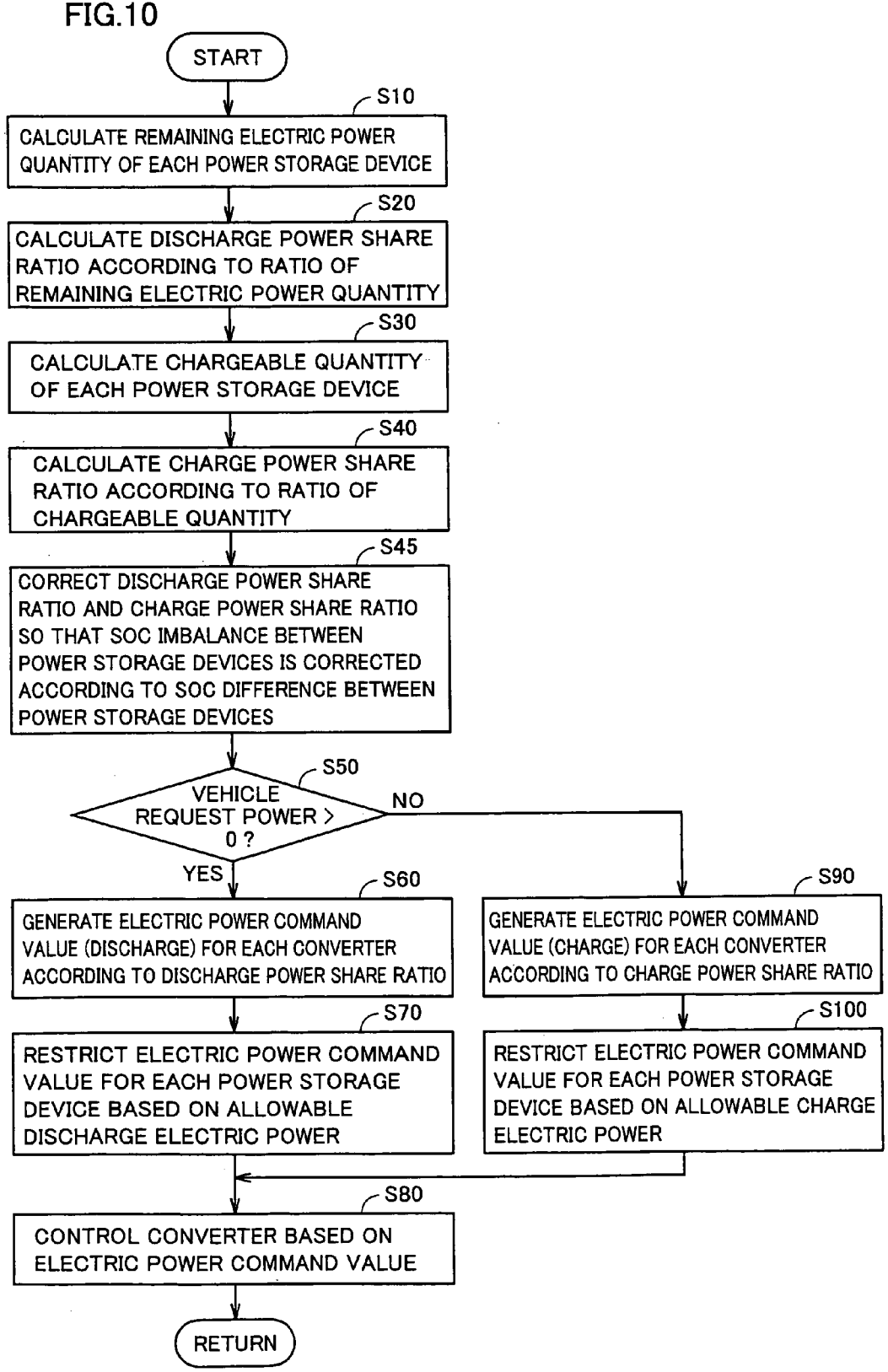
FIG. 10 is a flowchart illustrating a control structure of the converter ECU shown in FIG. 8.

FIG. 10 is a flowchart illustrating a control structure of converter ECU 2A shown in FIG. 8. The process of the flowchart is called from a main routine and executed at regular intervals or each time a predetermined condition is satisfied.

Referring to FIG. 10, the flowchart includes step S45 in addition to the steps in the flowchart shown in FIG. 7. Specifically, after the charge power share ratio is calculated in step S40, converter ECU 2A corrects the discharge power share ratio and the charge power share ratio according to SOC difference ΔS between power storage devices 6-1, 6-2, in such a manner that corrects the SOC imbalance between power storage devices 6-1, 6-2 (step S45).

More specifically, converter ECU 2A calculates correction amount Δr according to SOC difference ΔS calculated by subtracting state quantity SOC1 from state quantity SOC2 and, based on calculated correction amount Δr, corrects the discharge power share ratio and the charge power share ratio such that the imbalance between state quantities SOC1, SOC2 is corrected. After the discharge power share ratio and the charge power share ratio are corrected, converter ECU 2A proceeds to step S50.

According to the description above, the discharge power share ratio is corrected by adding correction amount Δr to r2 representing the discharge share ratio of power storage device 6-2, and the charge power share ratio is corrected by subtracting correction amount Δr from c2 representing the charge share ratio of power storage device 6-2. The method for correction based on SOC difference ΔS, however, is not limited to the above-described method. For example, when vehicle request power Ps is a positive value and electric power command generation unit 58 calculates electric power command values W01, W02, correction amount Δr may be reflected in the manner as shown by the following formulas.

$$W01 = Ps \times \{r1/(r1+r2) - \Delta r\} \quad (9)$$

$$W02 = Ps \times \{r2/(r2+r2) + \Delta r\} \quad (10)$$

When vehicle request power Ps is a negative value and electric power command generation unit 58 calculates electric power command values W01, W02, correction amount Δr may be reflected in the manner as shown by the following formulas.

$$W01 = Ps \times \{c1/(c1+c2) + \Delta r\} \quad (11)$$

$$W02 = Ps \times \{c2/(c1+c2) - \Delta r\} \quad (12)$$

As described above, the second embodiments corrects the discharge power share ratio and the charge power share ratio according to SOC difference ΔS between power storage devices 6-1, 6-2 such that the imbalance between respective SOCs of power storage devices 6-1, 6-2 is corrected. Therefore, the second embodiment can maximize the opportunity (period of time) to allow the chargeable free capacity and the dischargeable capacity of power supply system 1 as a whole to be effected to the maximum extent without impairing one of the chargeable free capacity and the dischargeable capacity.

Third Embodiment

Figure 11:
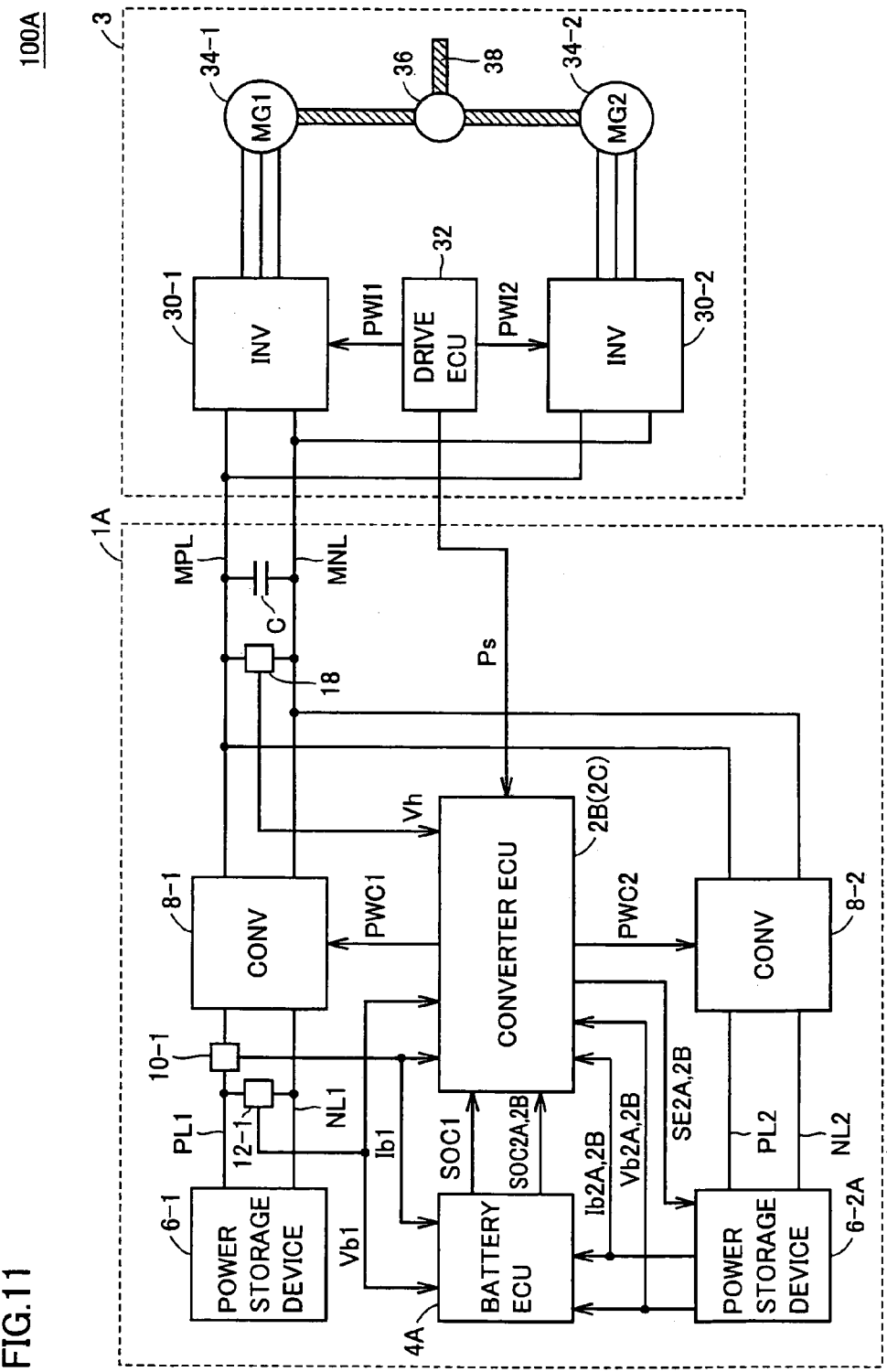
FIG. 11 is an overall block diagram of a vehicle according to a third embodiment.

FIG. 11 is an overall block diagram of a vehicle according to a third embodiment. Referring to FIG. 11, this vehicle 100A includes a power supply system 1A instead of power supply system 1 in the configuration of vehicle 100 in the first embodiment shown in FIG. 1. As compared with the configuration of power supply system 1, power supply system 1A includes a power storage device 6-2A instead of power storage device 6-2, and includes a converter ECU 2B and a battery ECU 4A instead of converter ECU 2 and battery ECU 4.

Figure 12:
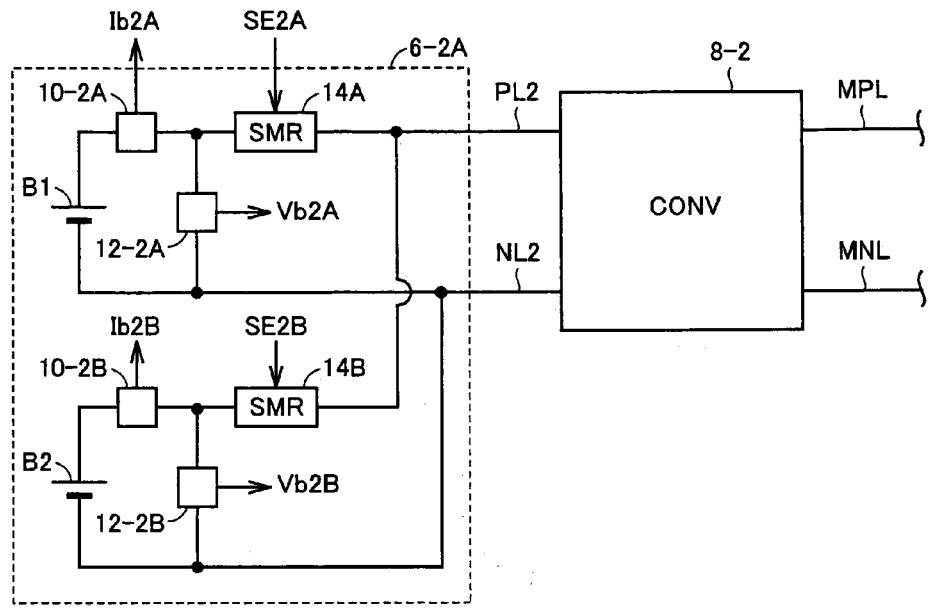
FIG. 12 is a schematic configuration diagram of a power storage device shown in FIG. 11.

FIG. 12 is a schematic configuration diagram of power storage device 6-2A shown in FIG. 11. Referring to FIG. 12, power storage device 6-2A includes power storage units B1, B2, current sensors 10-2A, 10-2B, voltage sensors 12-2A, 12-2B, and system main relays 14A, 14B.

Power storage units B1, B2 are connected in parallel to positive line PL2 and negative line NL2. Namely, power storage units B1, B2 are connected in parallel to converter 8-2. Power storage units B1, B2 are each a chargeable DC power supply, and is formed for example of a secondary battery such as nickel-metal hydride battery or lithium-ion battery. At least one of power storage units B1, B2 may be formed of an electrical double layer capacitor.

Current sensors 10-2A, 10-2B respectively detect current value Ib2A that is input/output to/from power storage unit B1, and current value Ib2B that is input/output to/from power storage unit B2, and output the results of detection to converter ECU 2B and battery ECU 4A (both are not shown). Voltage sensors 12-2A, 12-2B respectively detect voltage value Vb2A of power storage unit B1 and voltage value Vb2B of power storage unit B2, and output the results of detection to converter ECU 2B and battery ECU 4A.

System main relay 14A is provided between the positive electrode of power storage unit B1 and positive line PL2 and electrically connects/disconnects power storage unit B1 and converter 8-2 to/from each other according to signal SE2A from converter ECU 2B. System main relay 14B is provided between the positive electrode of power storage unit B2 and positive line PL2 and electrically connects/disconnects power storage unit B2 and converter 8-2 to/from each other according to signal SE2B from converter ECU 2B.

Although FIG. 12 shows power storage device 6-2A that includes two power storage units B1, B2 connected in parallel to each other, power storage device 6-2A may include three or more power storage units connected in parallel. In the following, a case will be described as an example where power storage device 6-2A includes two power storage units B1, B2.

Referring again to FIG. 11, battery ECU 4A calculates state quantity SOC2A representing SOC of power storage unit B1 (FIG. 12) of power storage device 6-2A based on current value Ib2A and voltage value Vb2A from power storage device 6-2A, and outputs the calculated state quantity SOC2A to converter ECU 2B. Battery ECU 4A also calculates state quantity SOC2B representing SOC of power storage unit B2 (FIG. 12) of power storage device 6-2A based on current value Ib2B and voltage value Vb2B from power storage device 6-2A, and outputs the calculated state quantity SOC2B to converter ECU 2B. Like battery ECU 4 in the first embodiment, battery ECU 4A also calculates state quantity SOC1 of power storage device 6-1 to output SOC1 to converter ECU 2B.

Converter ECU 2B generates drive signals PWC1, PWC2 for driving converters 8-1, 8-2 respectively, based on respective detected values from current sensor 10-1 and voltage sensors 12-1, 18, respective detected values of the voltage and current of each storage unit in power storage device 6-2A, state quantities SOC1, SOC2A, SOC2B from battery ECU 4A, and vehicle request power Ps from drive ECU 32. Converter ECU 2B also generates signals SE2A, SE2B for turning on/off system main relays 14A, 14B (FIG. 12) of power storage device 6-2A at specified timings, and outputs the signals to system main relays 14A, 14B respectively. The configuration of converter ECU 2B will be described hereinlater in detail.

Figure 13:
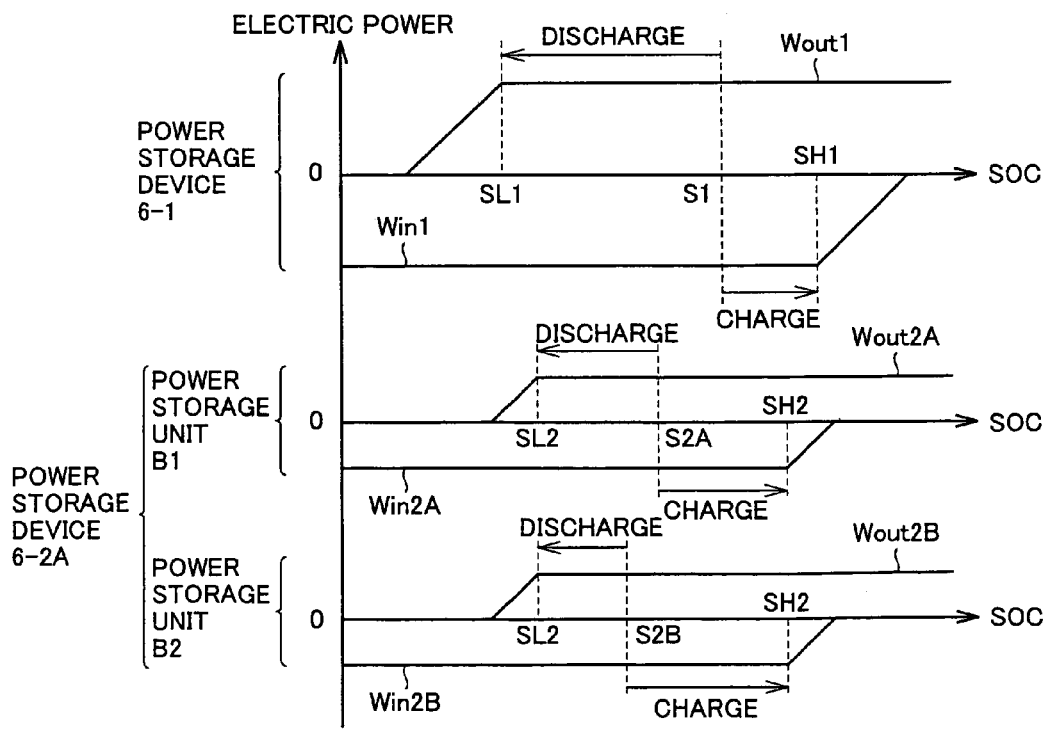
FIG. 13 is a diagram illustrating a concept about electric power share control for the power storage device and power storage units.

FIG. 13 is a diagram illustrating a concept about electric power share control for power storage device 6-1 and power storage units B1, B2. Referring to FIG. 13, the description given above in connection with FIG. 3 is also applied to power storage device 6-1. As to power storage unit B1, allowable discharge electric power Wout2A is the maximum of the electric power that can be instantaneously output from power storage unit B1 and, when SOC of power storage unit B1 becomes smaller than lower limit SL2, allowable discharge electric power Wout2A is restricted. Allowable charge electric power Win2A is the maximum of the electric power that can be instantaneously input to power storage unit B1 and, when SOC of power storage unit B1 becomes larger than upper limit SH2, allowable charge electric power Win2A is restricted. As to power storage unit B2, allowable discharge electric power Wout2B is the maximum of the electric power that can be instantaneously output from power storage unit B2 and, when SOC of power storage unit B2 becomes smaller than lower limit SL2, allowable discharge electric power Wout2B is restricted. Allowable charge electric power Win2B is the maximum of the electric power that can be instantaneously input to power storage unit B2 and, when SOC of power storage unit B2 becomes larger than upper limit SH2, allowable charge electric power Win2B is restricted.

The allowable discharge electric power and the allowable charge electric power as well as respective SOCs with respect to which the allowable discharge electric power and the allowable charge electric power are restricted vary depending on the characteristics of the power storage unit. The following description will be based on the supposition that power storage units B1, B2 have equivalent characteristics and that power storage units B1, B2 are substantially equivalent to each other in terms of the allowable discharge electric power and the allowable charge electric power as well as respective SOCs with respect to which the allowable discharge electric power and the allowable charge electric power are restricted.

If power storage devices 6-1, 6-2A are equally charged/discharged, the allowable discharge electric power or allowable charge electric power of one of the power storage devices 6-1, 6-2A is restricted before that of the other is restricted, so that the chargeable free capacity/dischargeable capacity of power supply system 1A as a whole that is the sum of respective chargeable free capacities/dischargeable capacities of power storage devices 6-1, 6-2A could be decreased. In the third embodiment, power storage device 6-2A includes power storage units B1, B2 connected in parallel to converter 8-2. Accordingly, the third embodiment calculates the sum of respective remaining electric power quantities and the sum of respective chargeable quantities of power storage units B1, B2, and uses respective sums as the remaining electric power quantity and the chargeable quantity of power storage device 6-2A to calculate the discharge power share ratio and the charge power share ratio between power storage device 6-1 and power storage device 6-2A. Accordingly, the opportunity (period of time) to allow the chargeable free capacity/dischargeable capacity of power supply system 1A as a whole to be effected to the maximum extent can be maximized.

FIG. 14 is a diagram illustrating a method for calculating the electric power share ratio between power storage devices 6-1, 6-2A. Referring to FIG. 14 together with FIG. 13, remaining electric power quantity R1 and chargeable quantity C1 of power storage device 6-1 are calculated using above formulas (1) and (3).

A calculation is also performed of remaining electric power quantity R2A of power storage unit B1 before SOC of power storage unit B1 reaches lower limit SL2 with respect to which allowable discharge electric power Wout2A of power storage unit B1 is restricted, using the following formula.

$$R2A = A2(S2A - SL2) \quad (13)$$

Here, A2 represents the power storage capacity of power storage unit B1 and S2A represents SOC of power storage unit B1 at the time when the calculation is performed.

A calculation is also performed of remaining electric power quantity R2B of power storage unit B2 before SOC of power storage unit B2 reaches lower limit SL2 with respect to which allowable discharge electric power Wout2B of power storage unit B2 is restricted, using the following formula.

$$R2B = A3(S2B - SL2) \quad (14)$$

Here, A3 represents the power storage capacity of power storage unit B2 and S2B represents SOC of power storage unit B2 at the time when the calculation is performed.

A calculation is further performed of remaining electric power quantity R2 of power storage device 6-2A before both of respective SOCs of power storage units B1, B2 reach lower limit SL2.

$$R2 = R2A + R2B \quad (15)$$

When electric power is supplied to from power supply system 1A to drive force generation unit 3, power storage devices 6-1, 6-2A are discharged such that the share ratio between the electric power discharged from power storage device 6-1 and the electric power discharged from power storage device 6-2A is R1:R2.

Further, a calculation is performed of chargeable quantity C2A of power storage unit B1 before SOC of power storage unit B1 reaches upper limit SH2 with respect to which allowable charge electric power Win2A of power storage unit B1 is restricted, using the following formula.

$$C2A = A2(SH2 - S2A) \quad (16)$$

A calculation is also performed of chargeable quantity C2B of power storage unit B2 before SOC of power storage unit B2 reaches upper limit SH2 with respect to which allowable charge electric power Win2B of power storage unit B2 is restricted.

$$C2B = A3(SH2 - S2B) \quad (17)$$

A calculation is further performed of chargeable quantity C2 of power storage device 6-2A before both of respective SOCs of power storage units B1, B2 reach upper limit SH2, using the following formula.

$$C2 = C2A + C2B \quad (18)$$

When electric power is supplied from drive force generation unit 3 to power supply system 1A, power storage devices 6-1, 6-2A are charged such that the share ratio between charge electric power of power storage device 6-1 and the charge electric power of power storage device 6-2A is C1:C2.

FIG. 15 is a diagram showing an example of variations of SOCs of power storage device 6-1 and power storage units B1, B2. Regarding FIG. 15, it is supposed that respective SOCs of power storage device 6-1 and power storage units B1, B2 have the same upper limit and the same lower limit. FIG. 15 shows the case where power storage device 6-1 and power storage units B1, B2 are discharged until respective SOCs of power storage device 6-1 and power storage units B1, B2 change from upper limit SH to lower limit SL.

Referring to FIG. 15, line k1 represents a variation of SOC of power storage device 6-1, and lines k2, k3 represent respective variations of SOCs of power storage units B1, B2. At time t0, both of power storage devices 6-1, 6-2A start being discharged. The share ratio between the discharge electric power of power storage device 6-1 and the discharge electric power of power storage device 6-2A is calculated based on formulas (1) and (13) to (15) above, such that respective SOCs of power storage devices 6-1, 6-2A simultaneously reach lower limit SL at time t2.

In power storage device 6-2A, power storage unit B1 is discharged while system main relay 14B associated with power storage unit B2 is kept OFF from time t0 to time t1. At time t1, SOC of power storage unit. B1 reaches lower limit SL, so that system main relay 14A for power storage unit B1 is turned off and system main relay 14B is turned on and accordingly power storage unit B2 is discharged from this time. Then, at time t2, respective SOCs of power storage device 6-1 and power storage unit B2 reach lower limit SL.

In FIG. 15, power storage unit B1 in power storage device 6-2A is used first and, after SOC of power storage unit B1 reaches the lower limit, power storage unit B2 is used. However, the order of use of power storage units B1, B2 may be switched at a specified timing, for the following reason. After SOC of power storage device 6-2A reaches the lower limit, the power storage unit that is lastly used is still used. If the same power storage unit is always used after. SOC reaches the lower limit, this power storage unit deteriorates earlier than the other power storage unit.

As for the switching of the order of use of power storage units B1, B2, the power storage unit to be used first may be changed each time the vehicle system is started. Alternatively, instead of using power storage units B1, B2 by turns as shown in FIG. 15, the power storage unit to be used may be switched frequently at specified timings so that power storage units B1, B2 are used alternately.

Figure 16:
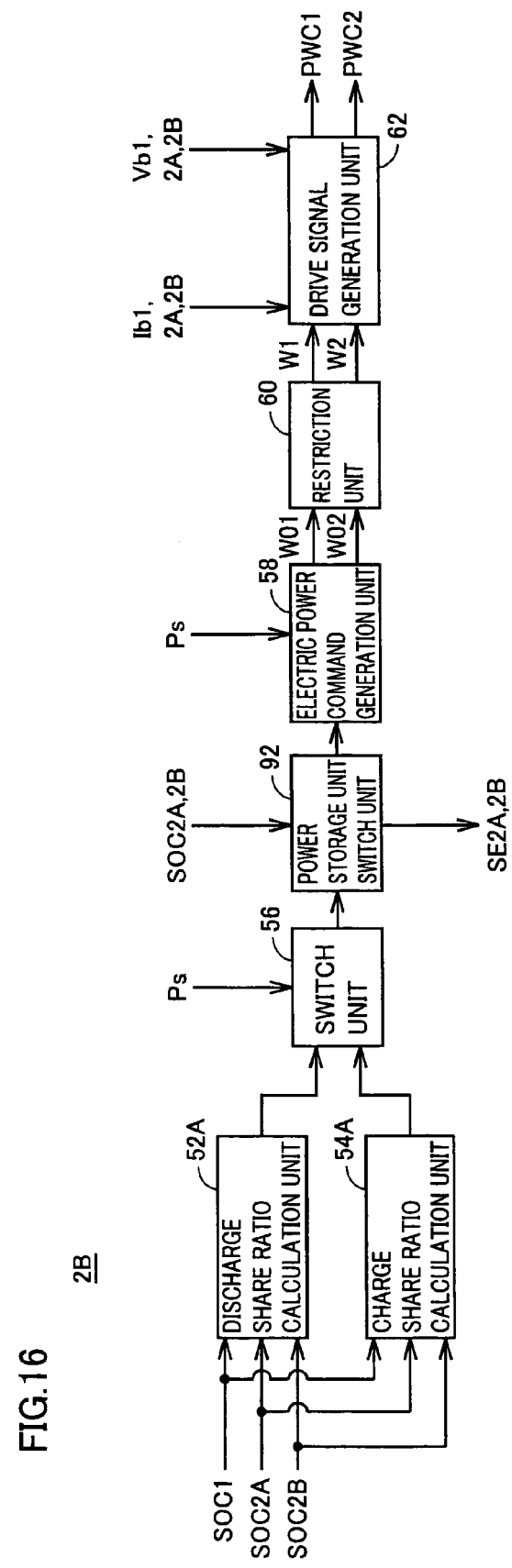
FIG. 16 is a functional block diagram of a converter ECU shown in FIG. 11.

FIG. 16 is a functional block diagram of converter ECU 2B shown in FIG. 11. Referring to FIG. 16, as compared with the configuration of converter ECU 2 in the first embodiment shown in FIG. 5, converter ECU 2B includes a discharge share ratio calculation unit 52A and a charge share ratio calculation unit 54A instead of discharge share ratio calculation unit 52 and charge share ratio calculation unit 54 respectively, and additionally includes a power storage unit switch unit 92.

Discharge share ratio calculation unit 52A receives from battery ECU 4A state quantity SOC1 of power storage device 6-1 as well as respective state quantities SOC2A, SOC2B of power storage units B1, B2 of power storage device 6-2A. Discharge share ratio calculation unit 52A calculates remaining electric power quantity R1 of power storage device 6-1 using above formula (1) and calculates remaining electric power quantity R2 of power storage device 6-2A using above formulas (13) to (15), and outputs, to switch unit 56, discharge power share ratio r1:r2 according to the ratio between calculated remaining electric power quantities R1, R2.

Charge share ratio calculation unit 54A receives state quantities SOC1, SOC2A, SOC2B from battery ECU 4A. Charge share ratio calculation unit 54A calculates chargeable quantity C1 of power storage device 6-1 using above formula (3) and calculates chargeable quantity C2 of power storage device 6-2A using above formulas (16) to (18), and outputs, to switch unit 56, charge power share ratio c1:c2 according to the ratio between calculated chargeable quantities C1, C2.

Power storage unit switch unit 92 switches the power storage unit to be used from/to power storage unit B1 to/from power storage unit B2, based on respective state quantities SOC2A, SOC2B of power storage units B1, B2. Specifically, in the case where power storage unit B1 is used and power storage unit B2 is not used, power storage unit switch unit 92 generates signals SE2A, SE2B for turning on system main relay 14A and turning off system main relay 14B respectively, and outputs the signals to system main relays 14A, 14B respectively. In contrast, in the case where power storage unit B2 is used and power storage unit B1 is not used, power storage unit switch unit 92 generates signal SE2A, SE2B for turning off system main relay 14A and turning on system main relay 14B respectively, and outputs the signals to system main relays 14A, 14B respectively.

As to the switch of the use from/to power storage units B1, B2, power storage units B1, B2 may be used by turns as shown in FIG. 15. In this case, the power storage unit to be used first may be switched each time the vehicle system is started.

Alternatively, power storage units B1, B2 may be switched frequently so that the power storage units are used alternately.

While a detailed description of the following will not be given, when power storage unit B1 is used, drive signal generation unit 62 uses current value Ib2A from current sensor 10-2A and voltage value Vb2A from voltage sensor 12-2A as the actual value of the current and the actual value of the voltage of power storage device 6-2A respectively. When power storage unit B2 is used, drive signal generation unit 62 uses current value Ib2B from current sensor 10-2B and voltage value Vb2B from voltage sensor 12-2B as the actual value of the current and the actual value of the voltage of power storage device 6-2A respectively.

Figure 17:
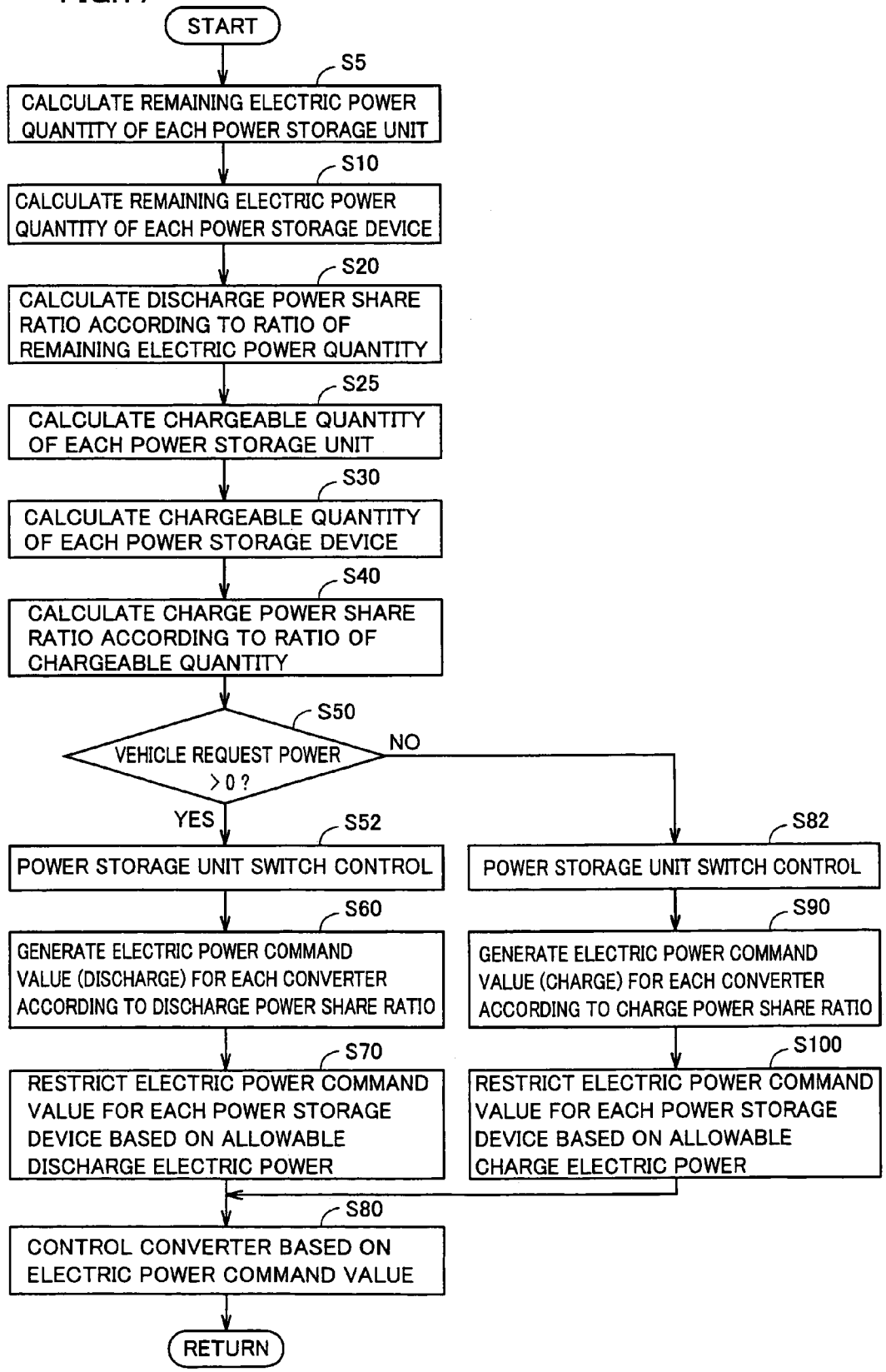
FIG. 17 is a flowchart illustrating a control structure of the converter ECU shown in FIG. 11.

FIG. 17 is a flowchart illustrating a control structure of converter ECU 2B shown in FIG. 11. The process of the flowchart is also called from a main routine and executed at regular intervals or each time a predetermined condition is satisfied.

Referring to FIG. 17, the flowchart includes steps S5, S25, S52 and S82 in addition to the steps of the flowchart shown in FIG. 7. Specifically, when a series of steps is started, converter ECU 2B calculates remaining electric power quantities R2A, R2B of power storage units B1, B2 using above formulas (13), (14), based on state quantities SOC2A, SOC2B from battery ECU 4A (step S5). The process proceeds to step S10 where above formulas (1), (15) are used to calculate remaining electric power quantity R1 of power storage device 6-1 and remaining electric power quantity R2 of power storage device 6-2A.

After discharge power share ratio r1:r2 is calculated in step S20, converter ECU 2B calculates chargeable quantities C2A, C2B of power storage units B1, B2 using above formulas (16), (17) based on state quantities SOC2A, SOC2B (step S25). The process then proceeds to step S30 where above formulas (3), (18) are used to calculate chargeable quantity C1 of power storage device 6-1 and chargeable quantity C2 of power storage device 6-2A.

When it is determined in step S50 that vehicle request power Ps is a positive value (YES in step S50), converter ECU 2B controls the switch of the use between power storage units B1, B2 by the above-described method, based on state quantities SOC2A, SOC2B (step S52). Specifically, ON/OFF of system main relays 14A, 14B is switched at a specified timing as described above (when SOC of power storage unit B1 reaches the lower limit, when the vehicle system is started, or frequently at specified intervals). Then, the process proceeds to step S60.

When it is determined in step S50 that vehicle request power Ps is not a positive value (NO in step S50), converter ECU 2B controls the switch of the use between power storage units B1, B2 by the above-described method, based on state quantities SOC2A, SOC2B (step S82). The process then proceeds to step S90.

As described above, in the third embodiment, power storage device 6-2A includes power storage units B1, B2. Accordingly, the sum of respective remaining electric power quantities of power storage units B1, B2 and the sum of respective chargeable quantities thereof are calculated, and the calculated sums are used respectively as remaining electric power quantity R2 and chargeable quantity C2 of power storage device 6-2A to calculate the discharge power share ratio and the charge power share ratio between power storage devices 6-1, 6-2A. Therefore, in the third embodiment as well, the opportunity (period of time) to allow the chargeable free capacity/dischargeable capacities of power supply system 1A as a whole to be effected to the maximum extent can be maximized.

Further, in the third embodiment, power storage units B1, B2 may also be used alternately by changing the power storage unit to be used first each time the vehicle system is started or by frequently making a switch between power storage units B1, B2 so that the power storage units are used alternately. Accordingly, the frequency at which one of power storage units B1, B2 is used is prevented from being higher than the frequency at which the other power storage unit is used. Thus, deterioration of one of power storage units B1, B2 is prevented from proceeding earlier than deterioration of the other power storage device.

While the following is not particularly shown, if respective characteristics of power storage units B1, B2 are equivalent to each other, power storage units B1, B2 may be used simultaneously, instead of being used alternately. In this case, while power storage units B1, B2 are short-circuited, a large short-circuit current does not flow from one of power storage units B1, B2 to the other since power storage units B1, B2 have equivalent characteristics. If power storage units B1, B2 are used simultaneously, the current and the voltage of power storage device 6-2A as a whole may be detected for each control operation, without detecting the current and voltage of power storage units B1, B2 each.

Fourth Embodiment

In a fourth embodiment, when vehicle request power Ps is within respective ranges of the allowable discharge electric power and the allowable charge electric power of power storage device 6-1 and power storage units B1, B2 each, converters 8-1, 8-2 are alternately operated and the converter to be stopped is gate-blocked. Accordingly, the switching loss of the converters is reduced.

The entire configuration of a vehicle in the fourth embodiment is identical to that of vehicle 100A in the third embodiment shown in FIGS. 11, 12.

Figure 18:
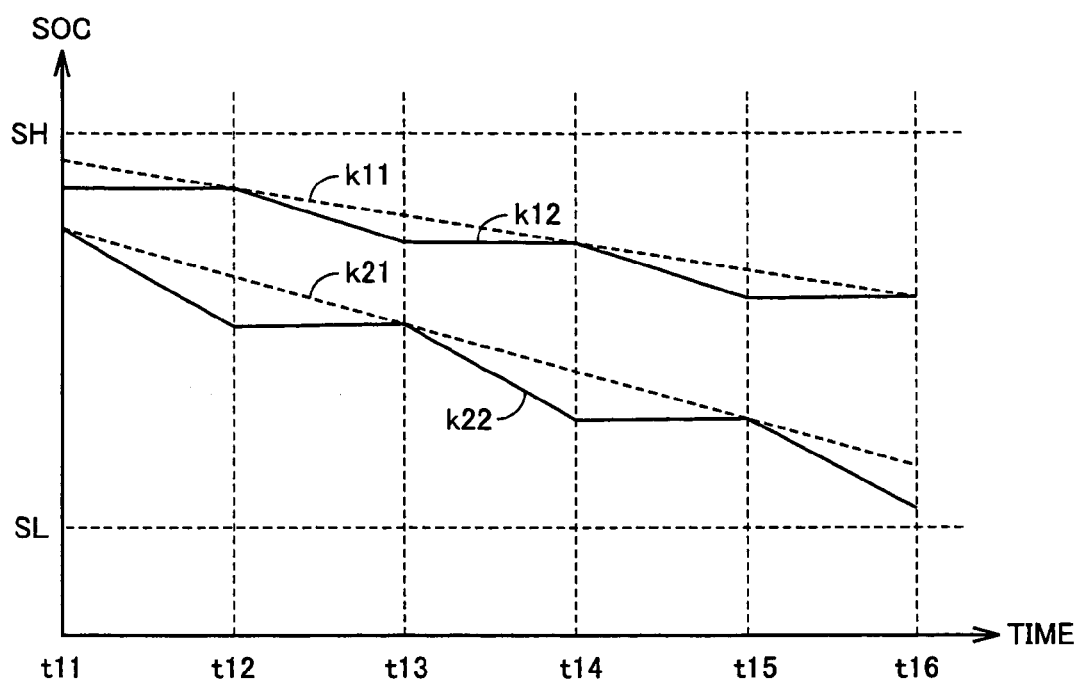
FIG. 18 is a diagram showing an example of variations of SOCs of the power storage device and power storage units according to a fourth embodiment.

FIG. 18 is a diagram showing an example of variations of SOCs of power storage device 6-1 and power storage unit B1 in the fourth embodiment. FIG. 18 corresponds to FIG. 15 where a part of the section from time t0 to time t1 is enlarged. In other words, the diagram shows the section where power storage unit B1 is used in power storage device 6-2A.

Referring to FIG. 18, dotted line k11 represents a target SOC of power storage device 6-1 and dotted line k21 represents a target SOC of power storage unit B1 of power storage device 6-2A. Solid line k12 represents a variation of state quantity SOC1 of power storage device 6-1 and solid line k22 represents a variation of state quantity SOC2A of power storage unit B1.

From time t11 to time t12, converter 8-1 associated with power storage device 6-1 is gate-blocked (shut down) and only converter 8-2 associated with power storage unit B1 is operated. Converter 8-2 is controlled using vehicle request power Ps as the electric power command value for converter 8-2. In this period as shown, state quantity SOC2A decreases while state quantity SOC1 is unchanged.

At time t12 when the difference between target SOC and state quantity SOC2A of power storage unit B1 becomes larger than a specified value, converter 8-2 is gate-blocked (shut down) and only converter 8-1 is operated. Converter 8-1 is controlled using vehicle request power Ps as the electric power command value for converter 8-1. In this period as shown, state quantity SOC1 decreases while state quantity SOC2A is unchanged.

At time t13 when the difference between target SOC and state quantity SOC1 of power storage device 6-1 becomes larger than a specified value, converter 8-1 is again gate-blocked (shut down) and only converter 8-2 is operated. After this, a switch is made between converters 8-1, 8-2 so that the converters operate alternately, and thus power storage device 6-1 and power storage unit B1 of power storage device 6-2A are used alternately.

In the fourth embodiment, power storage device 6-2A is formed of two power storage units B1, B2. Accordingly, the target SOC of power storage device 6-1 represented by dotted line k11 and the target SOC of power storage unit B1 represented by dotted line k21 are determined such that the rate of decrease of the target SOC of power storage device 6-1 is a half that of the target SOC of power storage unit B1.

Further, regarding the conditions for allowing the operational switch control of converters 8-1, 8-2 to be performed in the above-described manner, it is necessary that vehicle request power Ps is within respective ranges of the allowable discharge electric power and the allowable charge electric power of power storage device 6-1 and power storage units B1, B2 each as described above.

Figure 19:
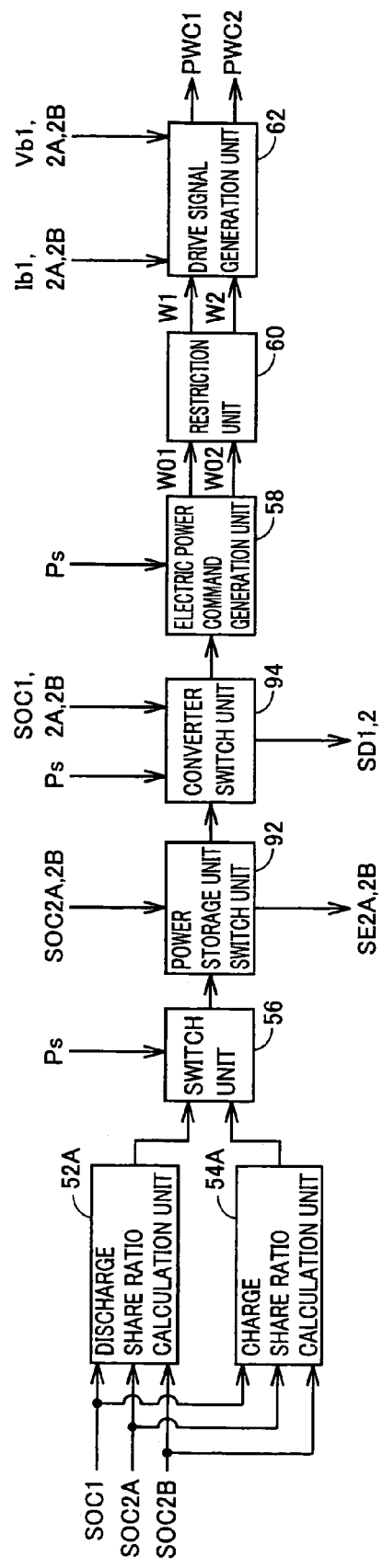
FIG. 19 is a functional block diagram of a converter ECU according to the fourth embodiment.

FIG. 19 is a functional block diagram of a converter ECU 2C in the fourth embodiment. Referring to FIG. 19, converter ECU 2C includes a converter switch unit 94 in addition to the components of converter ECU 2B in the third embodiment shown in FIG. 16.

Converter switch unit 94 receives vehicle request power Ps from drive ECU 32 of drive force generation unit 3, and receives state quantities SOC1, SOC2A, SOC2B of power storage device 6-1 and power storage units B1, B2 from battery ECU 4A.

Based on vehicle request power Ps and state quantities SOC1, SOC2A, SOC2B as received, converter switch unit 94 performs the operational switch control for converters 8-1, 8-2 by the above-described method. Specifically, in the case where converter 8-1 is operated and converter 8-2 is gate-blocked (shut down), converter switch unit 94 generates signal SD2 for giving an instruction to gate-block (shut down) converter 8-2 and outputs the signal to converter 8-2. In the case where converter 8-2 is operated and converter 8-1 is gate-blocked (shut down), converter switch unit 94 generates signal SD1 for giving an instruction to gate-block (shut down) converter 8-1 and outputs the signal to converter 8-1.

FIG. 20 is a flowchart illustrating a control structure of converter ECU 2C in the fourth embodiment. The process of the flowchart is also called from a main routine and executed at regular intervals or each time a predetermined condition is satisfied.

Referring to FIG. 20, this flowchart includes steps S54, S56, S84, S86 in addition to the steps of the flowchart shown in FIG. 17. Specifically, when the control of the switch of the use of power storage units B1, B2 is performed in step S52, converter ECU 2C determines whether or not vehicle request power Ps is smaller than the allowable discharge electric power of power storage device 6-1 and power storage units B1, B2 each (step S54).

When it is determined that vehicle request power Ps is smaller than each allowable discharge electric power (YES in step S54), converter ECU 2C performs the operational switch control for converters 8-1, 8-2 by the above-described method based on vehicle request power Ps and state quantities SOC1, SOC2A, SOC2B (step S56). The process then proceeds to step S60. In contrast, when it is determined that vehicle request power Ps is not less than each allowable discharge electric power (NO in step S54), step S56 is skipped and the process proceeds to step S60.

When the control of the switch of the use of power storage units B1, B2 is performed in step S82, converter ECU 2C determines whether or not vehicle request power Ps is larger than the allowable charge electric power (negative value) of power storage device 6-1 and power storage units B1, B2 each (step S84).

When it is determined that vehicle request power Ps is larger than each allowable charge electric power (YES in step S84), converter ECU 2C performs the operational switch control for converters 8-1, 8-2 by the above-described method based on vehicle request power Ps and state quantities SOC1, SOC2A, SOC2B (step S86). The process then proceeds to step S90. In contrast, when it is determined that vehicle request power Ps is not more than each allowable charge electric power (NO in step S84), step S86 is skipped and the process proceeds to step S90.

As described above, in the fourth embodiment, converters 8-1, 8-2 are alternately gate-blocked (shut down) when vehicle request power Ps is within respective ranges of the allowable discharge electric power and the allowable charge electric power of power storage device 6-1 and power storage units B1, B2 each. Thus, the fourth embodiment can reduce the switching loss of converters 8-1, 8-2.

In the fourth embodiment above, converters 8-1, 8-2 in the power supply system where power storage device 6-2A is formed of power storage units B1, B2 are alternately gate-blocked (shut down). In respective power supply systems of the first and second embodiments as well, similar control is applicable where converters 8-1, 8-2 are alternately gate-blocked (shut down).

Here, in the above-described embodiments each, the processes performed by converter ECU 2, ECU 2A to 2C are actually performed by a CPU (Central Processing Unit). The CPU reads from a ROM (Read Only Memory) a program for performing the processes shown by the above-described functional blocks and flowcharts, and executes the read program to perform the processes according to the above-described functional blocks and flowcharts. Therefore, the ROM corresponds to a computer (CPU)-readable recording medium on which a program is recorded for performing the processes shown by the above-described functional blocks and flowcharts.

In the above-described embodiments each, converters 8-1, 8-2 are controlled in both of the case where electric power is supplied from power supply system 1 to drive force generation unit 3 and the case where electric power is supplied from drive force generation unit 3 to power supply system 1, according to the discharge power share ratio and the charge power share ratio respectively. Instead of this, converters 8-1, 8-2 may be controlled in only one of the case where electric power is supplied from power supply system 1 to drive force generation unit 3 and the case where electric power is supplied from drive force generation unit 3 to power supply system 1, according to the discharge power share ratio or the charge power share ratio. In other words, the electric power share control according to the discharge power share ratio and the electric power share control according to the charge electric power share control may not necessarily be performed in combination.

The description above is applied to the case where power supply system 1 includes two power storage devices. The present invention, however, is not limited to the case where two power storage devices are provided, but is applicable as well to the case where three or more power storage devices are provided in parallel. In the latter case, the remaining electric power quantity and the chargeable quantity may be calculated for each power storage device and, based on the calculated remaining electric power quantity and the chargeable quantity, the discharge power share ratio and the charge power share ratio between the power storage devices may be calculated. Based on the calculated discharge power share ratio and charge power share ratio, the electric power command value for each power storage device may be calculated to control each converter.

In the third and fourth embodiments above, power storage device 6-2A is formed of two power storage units B1, B2. The present invention, however, is not limited to the case where two power storage units are provided, but is applicable as well to the case where three or more power storage units are provided in parallel.

Here, main positive bus MPL and main negative bus MNL in the description above correspond to "electric power line" of the present invention, and converters ECU 2, ECU 2A to 2C in the description above correspond to "control device" of the present invention. Further, discharge share ratio calculation unit 52 and charge share ratio calculation unit 54 as well as discharge share ratio calculation unit 52A and charge share ratio calculation unit 54A correspond to "share ratio calculation unit" of the present invention. Further, switch unit 56, electric power command generation unit 58, restriction unit 60 and drive signal generation unit 62, as well as power storage unit switch unit 92 and converter switch unit 94 are components of "converter control unit" of the present invention. Further, correction value calculation unit 64 and correction units 66, 68 are components of "correction unit" of the present invention.

It should be construed that embodiments disclosed herein are by way of illustration in all respects, not by way of limitation. It is intended that the scope of the present invention is defined by claims, not by the above description of the embodiments, and includes all modifications and variations equivalent in meaning and scope to the claims.

The invention claimed is:

1. A power supply system capable of supplying and receiving electric power to and from a load device, comprising:
   a plurality of chargeable power storage devices;
   an electric power line for supplying and receiving electric power between the power supply system and said load device;
   a plurality of converters provided in association with said plurality of power storage devices and each performing voltage conversion between an associated power storage device and said electric power line; and
   a control device controlling said plurality of converters, said control device including:
   a share ratio calculation unit performing at least one of a first calculation to determine a discharge power share ratio between respective electric powers to be discharged from said plurality of power storage devices, and a second calculation to determine a charge power share ratio between respective electric powers to be used for charging said plurality of power storage devices; and
   a converter control unit performing at least one of a first control to control said plurality of converters according to said discharge power share ratio when electric power is supplied from the power supply system to said load device, and a second control to control said plurality of converters according to said charge power share ratio when electric power is supplied from said load device to the power supply system, wherein
   said first calculation is performed to determine, for each of said plurality of power storage devices, a remaining electric power quantity before a state of charge is reached with respect to which an allowable discharge electric power representing a maximum value of electric power that can be instantaneously output is restricted, and determine said discharge power share ratio according to a ratio of said remaining electric power quantity between said plurality of power storage devices, and
   said second calculation is performed to determine, for each of said plurality of power storage devices, a chargeable quantity before a state of charge is reached with respect to which an allowable charge electric power representing a maximum value of electric power that can be instantaneously input is restricted, and determine said charge power share ratio according to a ratio of said chargeable quantity between said plurality of power storage devices.

2. The power supply system according to claim 1, wherein said first calculation is performed to determine said remaining electric power quantity of each of said plurality of power storage devices, based on a value determined by subtracting, from a first state value representing a current state of charge, a second state value representing a state of charge at which restriction of said allowable discharge electric power is started, and based on a power storage capacity of an associated power storage device, and
said second calculation is performed to determine said chargeable quantity of each of said plurality of power storage devices, based on a value determined by subtracting said first state value from a third state value representing a state of charge at which restriction of said allowable charge electric power is started, and based on a power storage capacity of an associated power storage device.

3. The power supply system according to claim 1, wherein said control device further includes a correction unit correcting said discharge power share ratio and said charge power share ratio such that an imbalance between respective states of charge of said plurality of power storage devices is corrected.

4. The power supply system according to claim 3, wherein said plurality of power storage devices include a first power storage device and a second power storage device, and
said correction unit corrects said discharge power share ratio and said charge power share ratio according to a difference between a state value representing a state of charge of said first power storage device and a state value representing a state of charge of said second power storage device.

5. The power supply system according to claim 1, wherein at least one of said plurality of power storage devices includes a plurality of power storage units connected in parallel to each other to an associated converter,
said first calculation for the power storage device including said plurality of power storage units is performed to determine a remaining electric power quantity of the power storage device by determining a sum of respective remaining electric power quantities of said plurality of power storage units, and
said second calculation for the power storage device including said plurality of power storage units is performed to determine a chargeable quantity of the power storage device by determining a sum of respective chargeable quantities of said plurality of power storage units.

6. The power supply system according to claim 5, further comprising a plurality of system main relays provided in association with said plurality of power storage units, and electrically connecting and disconnecting an associated power storage unit and the converter associated with the power storage device including said plurality of power storage units to and from each other, wherein
said converter control unit further controls operation of said plurality of system main relays such that said plurality of power storage units are used in a specified order and the order of use is switched at a specified timing.

7. The power supply system according to claim 5, wherein said plurality of power storage units are used simultaneously.

8. The power supply system according to claim 5, wherein said converter control unit alternately operates said plurality of converters and gate-blocks a non-operated converter, when a requested electric power of said load device is within a range of the allowable charge electric power and the allowable discharge electric power of each of said plurality of power storage devices.

9. A vehicle comprising:
the power supply system as recited in claim 1; and
a drive force generation unit receiving electric power supplied from said power supply system to generate a drive force for the vehicle.

10. A vehicle comprising:
the power supply system as recited in claim 2; and
a drive force generation unit receiving electric power supplied from said power supply system to generate a drive force for the vehicle.

11. A vehicle comprising:
the power supply system as recited in claim 3; and
a drive force generation unit receiving electric power supplied from said power supply system to generate a drive force for the vehicle.

12. A vehicle comprising:
the power supply system as recited in claim 4; and
a drive force generation unit receiving electric power supplied from said power supply system to generate a drive force for the vehicle.

13. A vehicle comprising:
the power supply system as recited in claim 5; and
a drive force generation unit receiving electric power supplied from said power supply system to generate a drive force for the vehicle.

14. A vehicle comprising:
the power supply system as recited in claim 6; and
a drive force generation unit receiving electric power supplied from said power supply system to generate a drive force for the vehicle.

15. A vehicle comprising:
the power supply system as recited in claim 7; and
a drive force generation unit receiving electric power supplied from said power supply system to generate a drive force for the vehicle.

16. A vehicle comprising:
the power supply system as recited in claim 8; and
a drive force generation unit receiving electric power supplied from said power supply system to generate a drive force for the vehicle.

* * * * *